US011782852B2

United States Patent
Ono et al.

(10) Patent No.: US 11,782,852 B2
(45) Date of Patent: Oct. 10, 2023

(54) COMMUNICATION DEVICE AND COMMUNICATION METHOD

(71) Applicant: PANASONIC INTELLECTUAL PROPERTY MANAGEMENT CO., LTD., Osaka (JP)

(72) Inventors: Tadashi Ono, Osaka (JP); Isao Kato, Osaka (JP); Yoshihisa Inagaki, Hyogo (JP); Shuichi Ohki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/208,354

(22) Filed: Mar. 22, 2021

(65) Prior Publication Data

US 2021/0209038 A1 Jul. 8, 2021

Related U.S. Application Data

(63) Continuation of application No. PCT/JP2019/019586, filed on May 16, 2019.

(30) Foreign Application Priority Data

Sep. 28, 2018 (JP) ................................ 2018-183088

(51) Int. Cl.
*G06F 13/42* (2006.01)
*G06F 13/16* (2006.01)

(52) U.S. Cl.
CPC ...... *G06F 13/1668* (2013.01); *G06F 13/4282* (2013.01); *G06F 2213/0026* (2013.01)

(58) Field of Classification Search
CPC ......... G06F 13/4282; G06F 2213/0026; G06F 13/385
See application file for complete search history.

(56) References Cited

U.S. PATENT DOCUMENTS

2003/0229746 A1 12/2003 Liu et al.
2019/0205277 A1* 7/2019 Koh ...................... H05K 5/026

FOREIGN PATENT DOCUMENTS

| JP | 2003009051 A | * | 1/2003 | ......... H04N 21/4147 |
| JP | 2005-088495 A | | 4/2005 | |

OTHER PUBLICATIONS

Communication pursuant to Article 94(3) EPC dated Oct. 5, 2021 for the related European Patent Application No. 19864122.7.
Compaq Hewlett-Packard: "Universal Serial Bus Specification", Universal Serial Bus Specification Revision, Apr. 27, 2000 (Apr. 27, 2000), pp. 1-650, XP055762163.
International Search Report and Written Opinion issued in International Patent Application No. PCT/JP2019/019586, dated Jun. 18, 2019; with partial English translation.

(Continued)

*Primary Examiner* — Idriss N Alrobaye
*Assistant Examiner* — Ronald T Modo
(74) *Attorney, Agent, or Firm* — McDermott Will & Emery LLP

(57) ABSTRACT

When a part of a signal line of a first interface and a part of a signal line of a second interface share a signal line and there is a memory connected to both the interfaces, initialization of the second interface and initialization of the memory are executed in parallel following initialization of the first interface.

12 Claims, 22 Drawing Sheets

(56) References Cited

OTHER PUBLICATIONS

The EPC Office Action dated Oct. 17, 2022 for the related European Patent Application No. 22182322.2.
Revision:"Universal Serial BusType-C Cable and Connector Specification", Aug. 11, 2014 (Aug. 11, 2014), XP055271614, Retrieved from the Internet: URL:http://www.those.ch/designtechnik/wp-content/uploads/2014/08/USB-Type-C-Specification-Release-1.0.pdf.

* cited by examiner

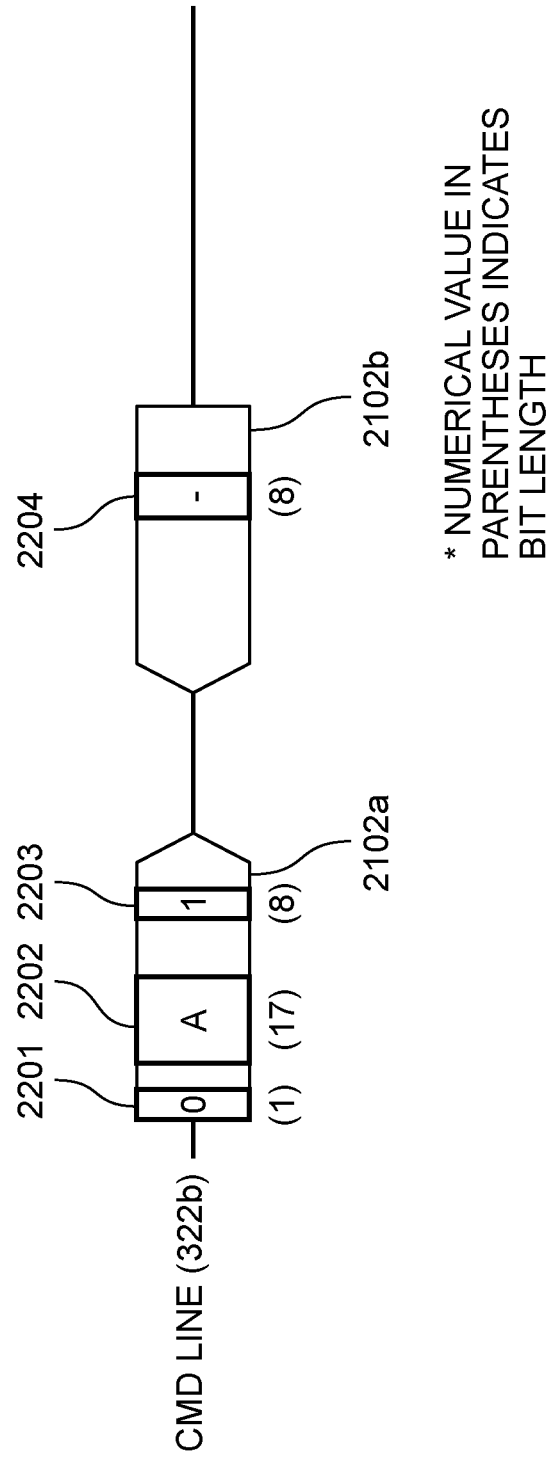

COMMUNICATION DEVICE AND COMMUNICATION METHOD

CROSS-REFERENCE OF RELATED APPLICATIONS

This application is a Continuation of International Patent Application No. PCT/JP2019/019586, filed on May 16, 2019, which in turn claims the benefit of Japanese Application No. 2018-183088, filed on Sep. 28, 2018, the entire disclosures of which Applications are incorporated by reference herein.

TECHNICAL FIELD

The present disclosure relates to a communication device and a communication method for communicating between a host device and a slave device that can be connected to each other.

BACKGROUND ART

In recent years, slave devices such as small, insertable card-shaped SD cards and memory sticks, which are equipped with a large-capacity non-volatile storage element such as a flash memory and capable of high-speed data processing, have become widespread in the market. Such slave devices are used in personal computers, smartphones, digital cameras, audio players, car navigation systems, and the like, which are host devices that can use the slave devices.

FIG. 1 is a diagram showing a terminal arrangement of conventional SD card 100 that has existed since its release. A terminal group of SD I/F, which is a single-ended low-speed interface (hereinafter abbreviated as I/F), is disposed in a first stage of conventional SD card 100. Specifically there are VDD1 (terminal #4) that supplies 3.3 V power, VSS1 (terminal #3) and VSS2 (terminal #6) that are connected to the ground, CMD (terminal #2) that communicates command and response signals, CLK (terminal #5) that transmits a clock signal used in the SD I/F, and DAT0, DAT1, DAT2, DAT3 (terminals #7, #8, #9, #1 respectively) that communicate data signals.

Recently PCI Express (hereinafter abbreviated as PCIe) using a differential serial system has been attracting attention as a high-speed I/F on the order of gigabit. The differential serial system is a system in which a signal X is transmitted using a transmission line composed of a pair of two signal lines, a signal line X+ and a signal line X−.

FIG. 2 is a diagram showing a terminal arrangement of SD-PCIe card 200 in which a PCIe I/F is added to conventional SD card 100. As a general rule, SD-PCIe card 200 assigns low-speed SD I/F terminals to a first stage and high-speed PCIe I/F terminals to a second stage. Hereinafter, terminal assignment of SD-PCIe card 200 different from that of conventional SD card 100 will be described.

In SD-PCIe card 200, VDD2 (terminal #14) that supplies 1.8 V power, VSS3 (terminal #10), VSS4 (terminal #13), and VSS5 (terminal #17) that are connected to the ground, Slave Rx+, Slave Rx− (terminals #11, #12 respectively) that transmit a data signal from a host device to a slave device, and Slave Tx+, Slave Tx− (terminals #16, #15 respectively) that transmit a data signal from the slave device to the host device are added as the PCIe I/F terminals. Then, REFCLK+, REFCLK−, which transmit a clock signal for the PCIe I/F from the host device to the slave device, are assigned to terminals #7, #8, respectively of the first stage. In other words, terminal #7 is shared by SD I/F DAT0 and PCIe I/F REFCLK+, and terminal #8 is shared by SD I/F DAT1 and PCIe I/F REFCLK−.

Further, in the PCIe I/F, there are a CLKREQ# signal for notifying of the start and end of a power consumption reduction phase, and a PERST# signal for resetting the slave device. The former is assigned to terminal #9 and shared with SD I/F DAT2. The latter is assigned to terminal #1 and shared with SD I/F DAT3.

In a small card-shaped slave device such as an SD card, a number of terminals that can be mounted is limited from the viewpoint of a mounting area. Therefore, by sharing the signal lines of the low-speed SD I/F and the high-speed PCIe I/F as described above, an increase in the number of terminals has been suppressed.

FIG. 3 is a diagram illustrating an exemplary embodiment of a conventional memory system which consists of SD-PCIe host device 300 capable of handling both an SD I/F and a PCIe I/F and SD-PCIe slave device 310 also capable of handling both an SD I/F and a PCIe I/F. SD-PCIe host device 300 includes host device semiconductor chip 301, first power supply unit 302 that supplies 3.3 V power, and second power supply unit 303 that supplies 1.8 V power. Further, host device semiconductor chip 301 includes host SD physical layer 304 and host PCIe physical layer 305.

On the other hand, SD-PCIe slave device 310 includes slave device semiconductor chip 311 and flash memory 312. Slave device semiconductor chip 311 includes slave SD physical layer 314 and slave PCIe physical layer 315.

First power supply unit 302 supplies 3.3 V power to SD-PCIe slave device 310 via VDD1 line 321a. SD-PCIe slave device 310 supplies the supplied 3.3 V power to slave device semiconductor chip 311 and flash memory 312.

Further, second power supply unit 303 supplies 1.8 V power to SD-PCIe slave device 310 via VDD2 line 321b. SD-PCIe slave device 310 supplies the supplied 1.8 V power to slave device semiconductor chip 311, especially slave PCIe physical layer 315.

An SDCLK signal having input/output terminals on host SD physical layer 304 and slave SD physical layer 314 is transmitted via SDCLK line 322a. Similarly a CMD signal having input/output terminals on host SD physical layer 304 and slave SD physical layer 314 is transmitted via CMD line 322b.

Either one of a REFCLK+ signal having input/output terminals on host PCIe physical layer 305 and slave PCIe physical layer 315 and a DAT0 signal having input/output terminals on host SD physical layer 304 and slave SD physical layer 314 is selected by switches mounted on host device semiconductor chip 301 and slave device semiconductor chip 311 and transmitted via REFCLK+/DAT0 line 323a. Similarly either one of a REFCLK− signal and a DAT1 signal, a CLKREQ# signal and a DAT2 signal, and a PERST# signal and a DAT3 signal are selected by switches, and transmitted via REFCLK−/DAT1 line 323b, CLKREQ#/DAT2 line 323c, and PERST#/DAT3 line 323d, respectively.

Furthermore, a Host Tx+ terminal of host PCIe physical layer 305 and a Slave Rx+ terminal of slave PCIe physical layer 315, and a Host Tx− terminal of host PCIe physical layer 305 and a Slave Rx− terminal of slave PCIe physical layer 315 are connected via high-speed downstream+ line 324a and high-speed downstream− line 324b, respectively. High-speed downstream line 324 that combines these is used when a PCIe I/F packet is transmitted from SD-PCIe host device 300 to SD-PCIe slave device 310.

Similarly a Host Rx+ terminal of host PCIe physical layer 305 and a Slave Tx+ terminal of slave PCIe physical layer 315, and a Host Rx-terminal of host PCIe physical layer 305 and a Slave Tx- terminal of slave PCIe physical layer 315 are connected via high-speed upstream+ line 325a and high-speed upstream- line 325b, respectively. High-speed upstream line 325 that combines these is used when a PCIe I/F packet is transmitted from SD-PCIe slave device 310 to SD-PCIe host device 300.

FIG. 4 is a diagram illustrating an example of a conventional initialization processing procedure of SD-PCIe slave device 310 by SD-PCIe host device 300, and FIG. 5 is a diagram illustrating details of communication on CMD line 322b in FIG. 4.

Further, FIGS. 6 and 7 are block diagrams illustrating connection modes of SD-PCIe host device 300 and SD-PCIe slave device 310 in an SD I/F mode and a PCIe I/F mode, respectively.

Hereinafter, details of the initialization procedure of SD-PCIe slave device 310 by SD-PCIe host device 300 will be described with reference to FIGS. 3 to 7.

In FIG. 4, SD-PCIe host device 300 supplies 3.3 V power via VDD1 line 321a (401) to start SD I/F initialization stage 411, and SD-PCIe host device 300 executes the following processing. Host SD physical layer 304 in host device semiconductor chip 301 supplies single-ended SDCLK to SD-PCIe slave device 310 via SDCLK line 322a (402) and a mode is switched to the SD I/F mode shown in FIG. 6. At this time, in host device semiconductor chip 301, REFCLK+/DAT0 line 323a, REFCLK-/DAT1 line 323b, CLKREQ#/DAT2 line 323c, and PERST#/DAT3 line 323d are all connected to the terminals on a side of host SD physical layer 304.

When SD-PCIe slave device 310 receives SDCLK, a mode is switched to the SD I/F mode shown in FIG. 6. In other words, in slave device semiconductor chip 311, REFCLK+/DAT0 line 323a, REFCLK-/DAT1 line 323b, CLKREQ#/DAT2 line 323c, and PERST#/DAT3 line 323d are all connected to the terminals on a side of slave SD physical layer 314.

Subsequently, I/F confirmation command 403a is transmitted from host device semiconductor chip 301 to slave device semiconductor chip 311. In response to this, I/F confirmation response 403b is transmitted from slave device semiconductor chip 311 to host device semiconductor chip 301.

FIG. 5 is a diagram illustrating details of I/F confirmation command 403a and I/F confirmation response 403b.

Since host device semiconductor chip 301 supports PCIe (that is, it has host PCIe physical layer 305), it sets PCIe support flag 501 in I/F confirmation command 403a to 1, and transmits the command to SD-PCIe slave device 310 via host SD physical layer 304 and CMD line 322b.

I/F confirmation command 403a received by SD-PCIe slave device 310 via CMD line 322b is supplied to slave device semiconductor chip 311 via slave SD physical layer 314 because it is currently in the SD I/F mode. Since slave device semiconductor chip 311 supports PCIe (that is, it has slave PCIe physical layer 315) and PCIe support flag 501 in I/F confirmation command 403a is set to "1", the slave device semiconductor chip sets PCIe support flag 502 in I/F confirmation response 403b to 1, and transmits the response to SD-PCIe host device 300 via slave SD physical layer 314 and CMD line 322b.

I/F confirmation response 403b received by SD-PCIe host device 300 via CMD line 322b is supplied to host device semiconductor chip 301 via host SD physical layer 304 because it is currently in the SD I/F mode.

Host device semiconductor chip 301 determines that SD-PCIe slave device 310 supports a PCIe I/F because PCIe support flag 502 in I/F confirmation response 403b is set to "1". With this, SD I/F initialization stage 411 is completed, and the process shifts to PCIe I/F initialization stage 412.

At this time, the following processing is performed.

To terminate SD I/F initialization stage 411, host SD physical layer 304 stops supply of SDCLK over SDCLK line 322a (404).

To start PCIe I/F initialization stage 412, second power supply unit 303 in SD-PCIe host device 300 supplies 1.8 V power via VDD2 line 321b (405), and the mode is switched to the PCIe I/F mode shown in FIG. 7. At this time, in host device semiconductor chip 301, REFCLK+/DAT0 line 323a, REFCLK-/DAT1 line 323b, CLKREQ#/DAT2 line 323c, and PERST#/DAT3 line 323d are all connected to the terminals on a side of host PCIe physical layer 305.

Further, when slave device semiconductor chip 311 receives 1.8 V power supply via VDD2 line 321b, the mode is switched to the PCIe I/F mode shown in FIG. 7. At this time, in slave device semiconductor chip 311, REFCLK+/DAT0 line 323a, REFCLK-/DAT1 line 323b, CLKREQ#/DAT2 line 323c, and PERST#/DAT3 line 323d are all connected to the terminals on a side of slave PCIe physical layer 315.

After 1.8 V power supply (405), host device semiconductor chip 301 instructs host PCIe physical layer 305 to supply REFCLK, which is a reference signal for the PCIe I/F. At this time, host PCIe physical layer 305 supplies REFCLK to SD-PCIe slave device 310 via REFCLK+/DAT0 line 323a and REFCLK-/DAT1 line 323b (406).

Subsequently, in order to initialize the PCIe I/F, host device semiconductor chip 301 transmits PCIe initialization instruction packet 407a to SD-PCIe slave device 310 via host PCIe physical layer 305 and high-speed downstream line 324. Upon receiving PCIe initialization instruction packet 407a, slave device semiconductor chip 311 performs necessary PCIe I/F initialization processing, and transmits a result of the processing as PCIe initialization response packet 407b to SD-PCIe host device 300 via high-speed upstream line 325.

In actual initialization of the PCIe I/F, the above series of packet transmission/reception processing is repeated several times, but detailed description thereof will be omitted here.

After the PCIe I/F initialization is completed, the process shifts from PCIe I/F initialization stage 412 to flash memory initialization stage 413.

In flash memory initialization stage 413, host device semiconductor chip 301 transmits flash memory initialization instruction packet 408a to SD-PCIe slave device 310 via host PCIe physical layer 305 and high-speed downstream line 324.

Upon receiving flash memory initialization instruction packet 408a, slave device semiconductor chip 311 starts flash memory 312, reads firmware for controlling flash memory 312, and updates a table to maintain consistency of file data and a management table recorded in flash memory 312. After the series of flash memory initialization processing is completed, slave device semiconductor chip 311 transmits flash memory initialization response packet 408b to SD-PCIe host device 300 via high-speed upstream line 325.

Note that the flash memory initialization procedure described here is an example, and other procedures can also be performed.

When SD-PCIe host device 300 receives flash memory initialization response packet 408b, all the initialization of SD-PCIe slave device 310 is completed, and the process shifts from flash memory initialization stage 413 to memory access stage 414. In the memory access stage, SD-PCIe host device 300 can read data from and write data to flash memory 312 in SD-PCIe slave device 310 via the PCIe I/F.

Note that the SD-PCIe host device in this memory system can be achieved by a configuration shown in FIG. 8 in addition to the configuration shown in FIG. 3. Host device semiconductor chip 801 of SD-PCIe host device 800 in FIG. 8 does not have a changeover switch such as REFCLK+/DAT0 line 323a inside. In such a case, switch group 802 having a switch function of shared signal lines may be mounted on a substrate of SD-PCIe host device 800 outside host device semiconductor chip 801.

CITATION LIST

Patent Literature

PTL 1: Unexamined Japanese Patent Publication No. 2005-088495

SUMMARY

In the conventional initialization procedure shown in FIG. 4, SD I/F initialization stage 411, PCIe I/F initialization stage 412, and flash memory initialization stage 413 are sequentially executed, and then the process shifts to memory access stage 414 in which the memory can be read and written.

By the way, PCIe I/F initialization stage 412 and flash memory initialization stage 413 usually take a time on the order of 100 to several hundred milliseconds. Therefore, it may take a time on the order of several seconds to read programs of various applications running on SD-PCIe host device 300 from flash memory 312 of SD-PCIe slave device 310 and to load them on SD-PCIe host device 300 to start.

In particular, in-vehicle devices these days are becoming more electronic, and weight of applications that run on software is extremely high, so it takes more time to load programs than ever before. On the other hand, since it is requested to shorten time until all the applications can operate, it is required to achieve the above time shortening by shortening initialization time.

In addition, a PCIe I/F can read and write data at high speed, but on the other hand, power consumption is large, so there is a power consumption reduction phase in which supply of REFCLK is stopped and data is not sent or received via the PCIe I/F. At this time, even when SD-PCIe host device 300 reads and writes small size data from and to SD-PCIe slave device 310, it is necessary to restore the PCIe I/F, and it is not preferable from the viewpoint of time required for restoration and power consumption.

Furthermore, if an error occurs in the PCIe I/F, it is necessary to reinitialize entire SD-PCIe host device 300 and SD-PCIe slave device 310, which is extremely inefficient.

In view of the above problems, the present invention provides, in a memory system including an SD-PCIe host device and an SD-PCIe slave device, a communication device and a communication method that can achieve shortening of initialization time, communication that does not require restoration of a PCIe I/F, and reinitialization of only the PCIe I/F.

In the present disclosure, when a part of a signal line of a first interface and a part of a signal line of a second interface share a signal line and there is a memory connected to both the interfaces, initialization of the second interface and initialization of the memory are executed in parallel following initialization of the first interface.

Furthermore, low-speed communication via the first interface and high-speed communication via the second interface do not interfere with each other.

Furthermore, when it is detected that the second interface is in an abnormal state, the second interface is restored to a normal state by communication via the first interface.

Further, the first interface is an SD I/F, and the second interface is a PCIe I/F.

According to the present disclosure, in a host device and a slave device including a flash memory that have both a PCIe I/F and an SD I/F and share a part of signal lines, data reading and writing in a power consumption reduction phase and efficient restoration during occurrence of an abnormality in the PCIe I/F can be achieved in addition to shortening of initialization time.

BRIEF DESCRIPTION OF DRAWINGS

FIG. 22 is a diagram illustrating in detail a register access command and a register access response in the fourth exemplary embodiment.

DESCRIPTION OF EMBODIMENTS

Figure 1:
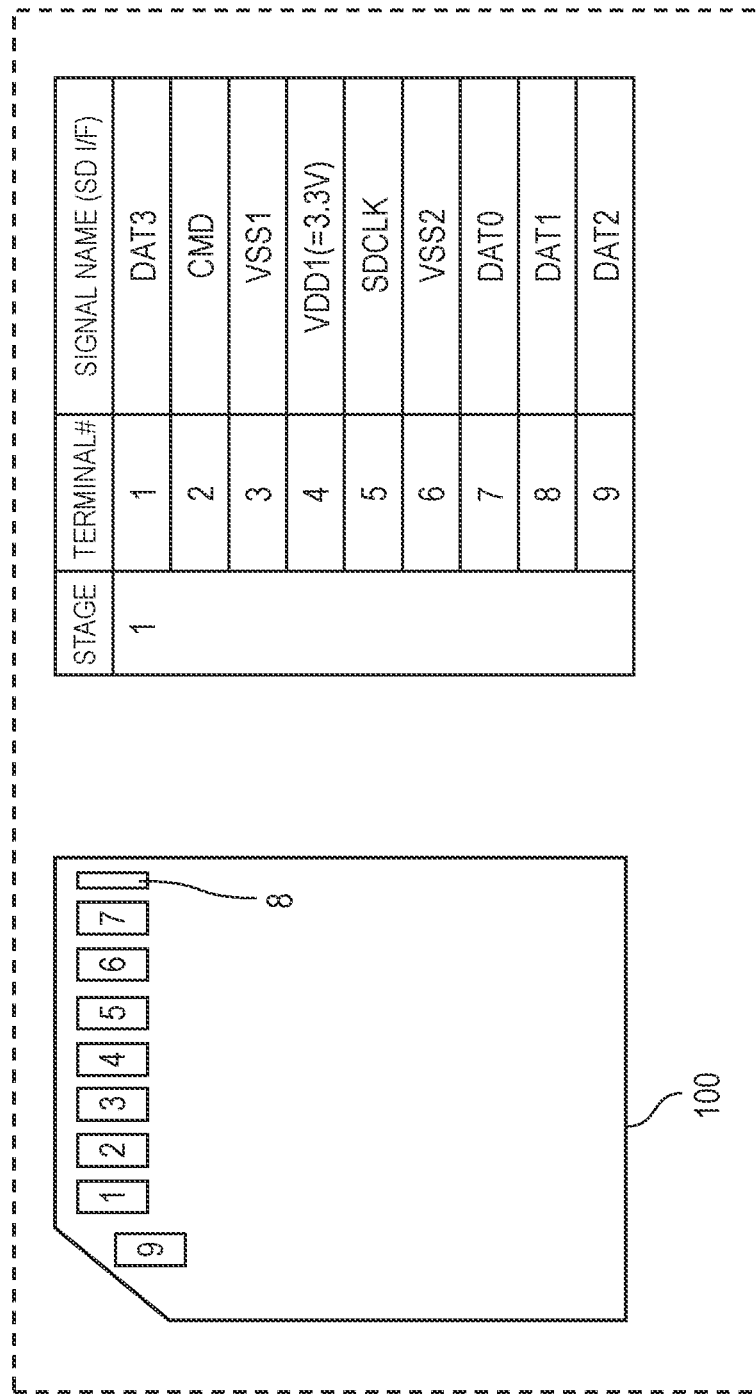
FIG. 1 is a diagram illustrating a terminal arrangement of a conventional SD card.
Figure 2:
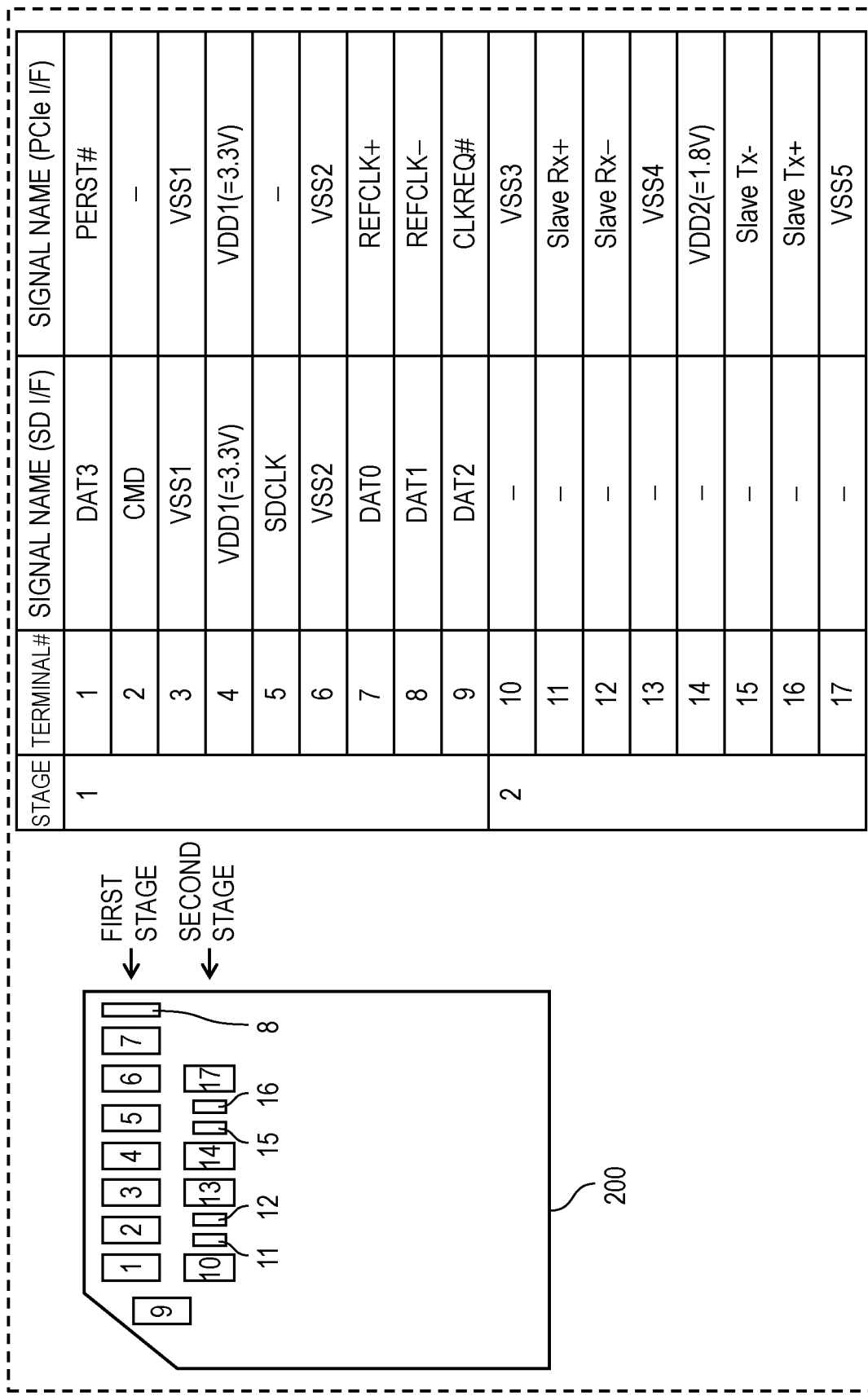
FIG. 2 is a diagram illustrating a terminal arrangement of an SD-PCIe card.

Hereinafter, exemplary embodiments will be described in detail with appropriate reference to the drawings. However, a detailed description more than necessary may be omitted. For example, the detailed description of already well-known matters and the overlap description of substantially same configurations may be omitted. This is to avoid an unnecessarily redundant description below and to facilitate understanding of a person skilled in the art. It should be noted that components with same reference numerals have same functions in the respective exemplary embodiments.

It should be noted that the present disclosure provides the appended drawings and the following description in order to allow those skilled in the art to fully understand the present disclosure, and does not intend to limit the subject matter described in the appended claims by the appended drawings and the following description.

First Exemplary Embodiment

Figure 9:
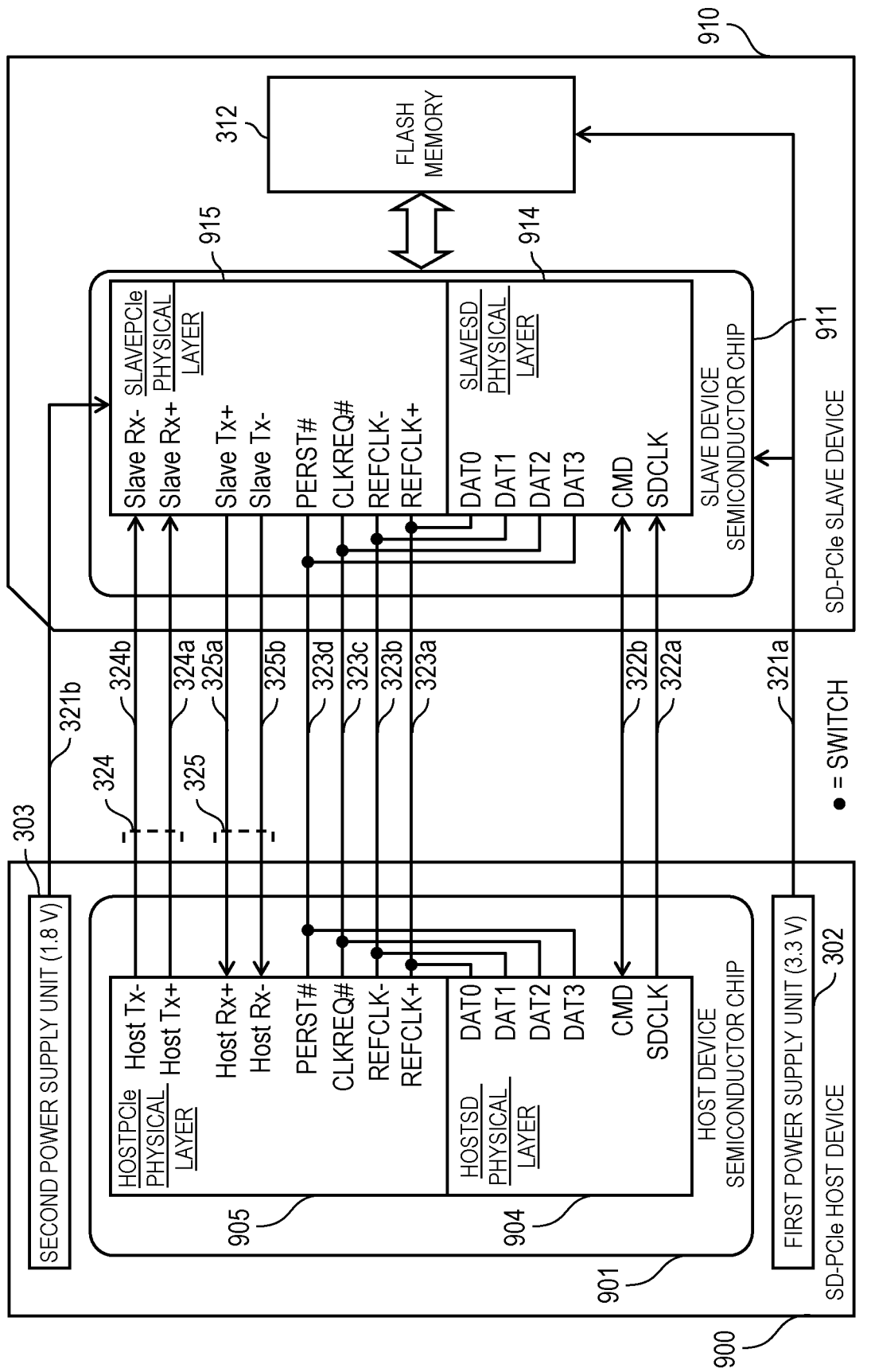
FIG. 9 is a diagram illustrating an SD-PCIe host device and an SD-PCIe slave device in a first exemplary embodiment.

FIG. 9 is a diagram illustrating a configuration of a memory system according to a first exemplary embodiment of the present invention. FIG. 9 shows SD-PCIe host device 900, host device semiconductor chip 901, host SD physical layer 904, host PCIe physical layer 905, SD-PCIe slave device 910, slave device semiconductor chip 911, slave SD physical layer 914, and slave PCIe physical layer 915. SD-PCIe host device 900 and SD-PCIe slave device 910 have the same configurations as SD-PCIe host device 300 and SD-PCIe slave device 310 in the conventional exemplary embodiment, respectively and a connection mode between the two is also similar to that shown in FIG. 3, but operation of each component is different. This will be described later.

Figure 10:
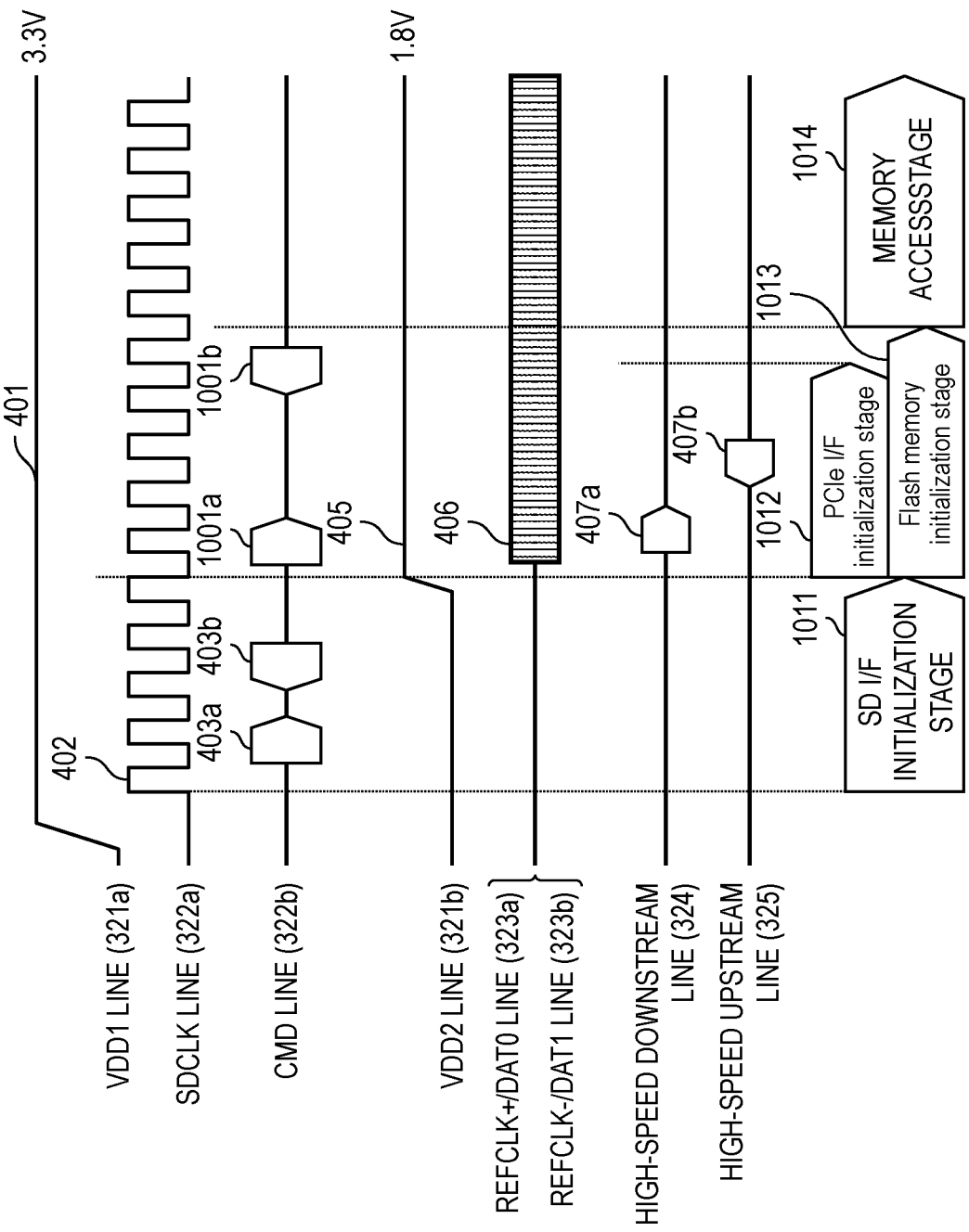
FIG. 10 is a diagram illustrating a procedure of initialization processing in the first exemplary embodiment.

FIG. 10 is a diagram illustrating a procedure of initialization processing of SD-PCIe slave device 910 by SD-PCIe host device 900 according to the first exemplary embodiment of the present invention.

Figure 11:
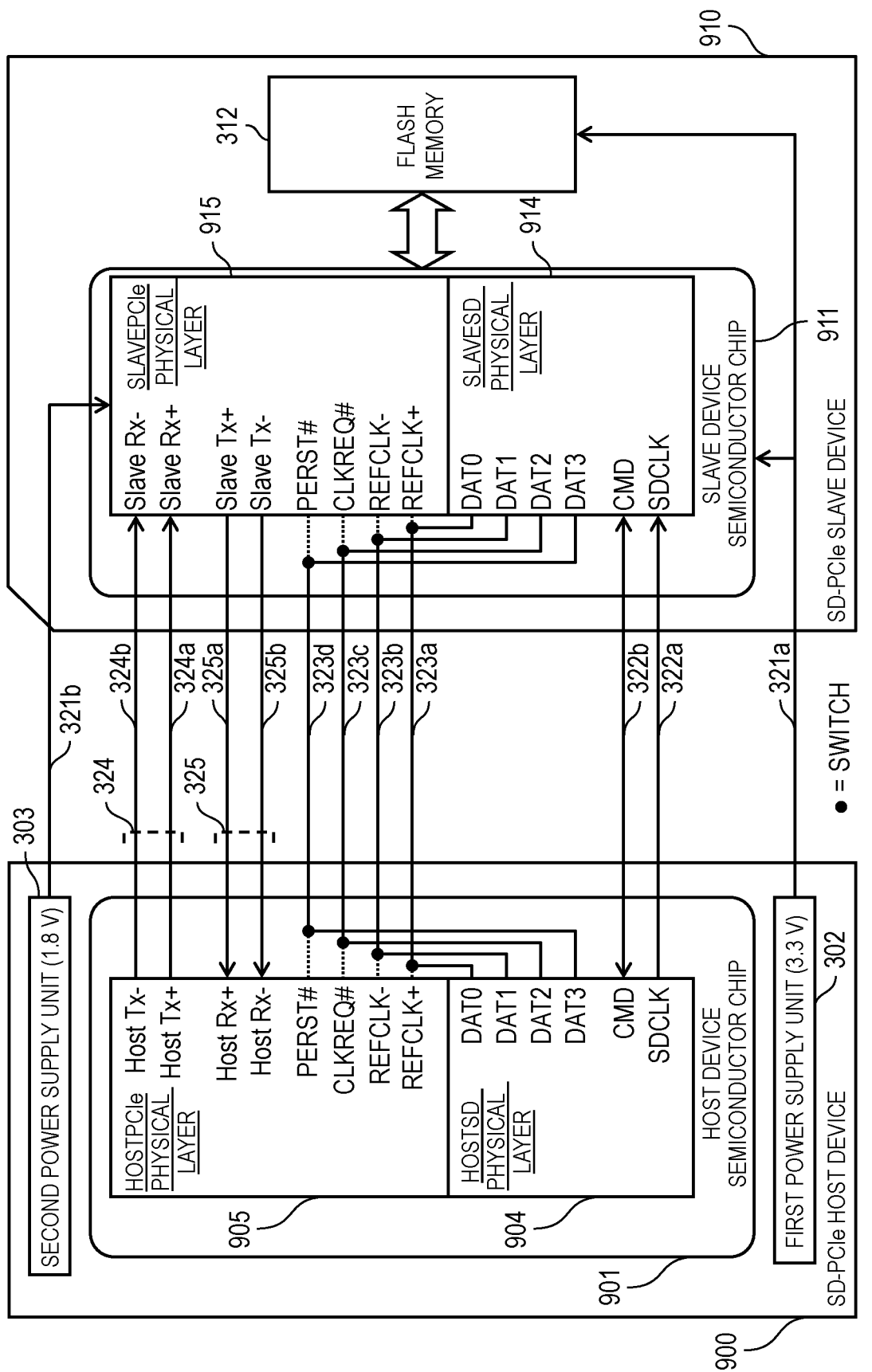
FIG. 11 is a diagram illustrating a connection mode of the SD-PCIe host device and the SD-PCIe slave device in an SD I/F mode in the first exemplary embodiment.
Figure 12:
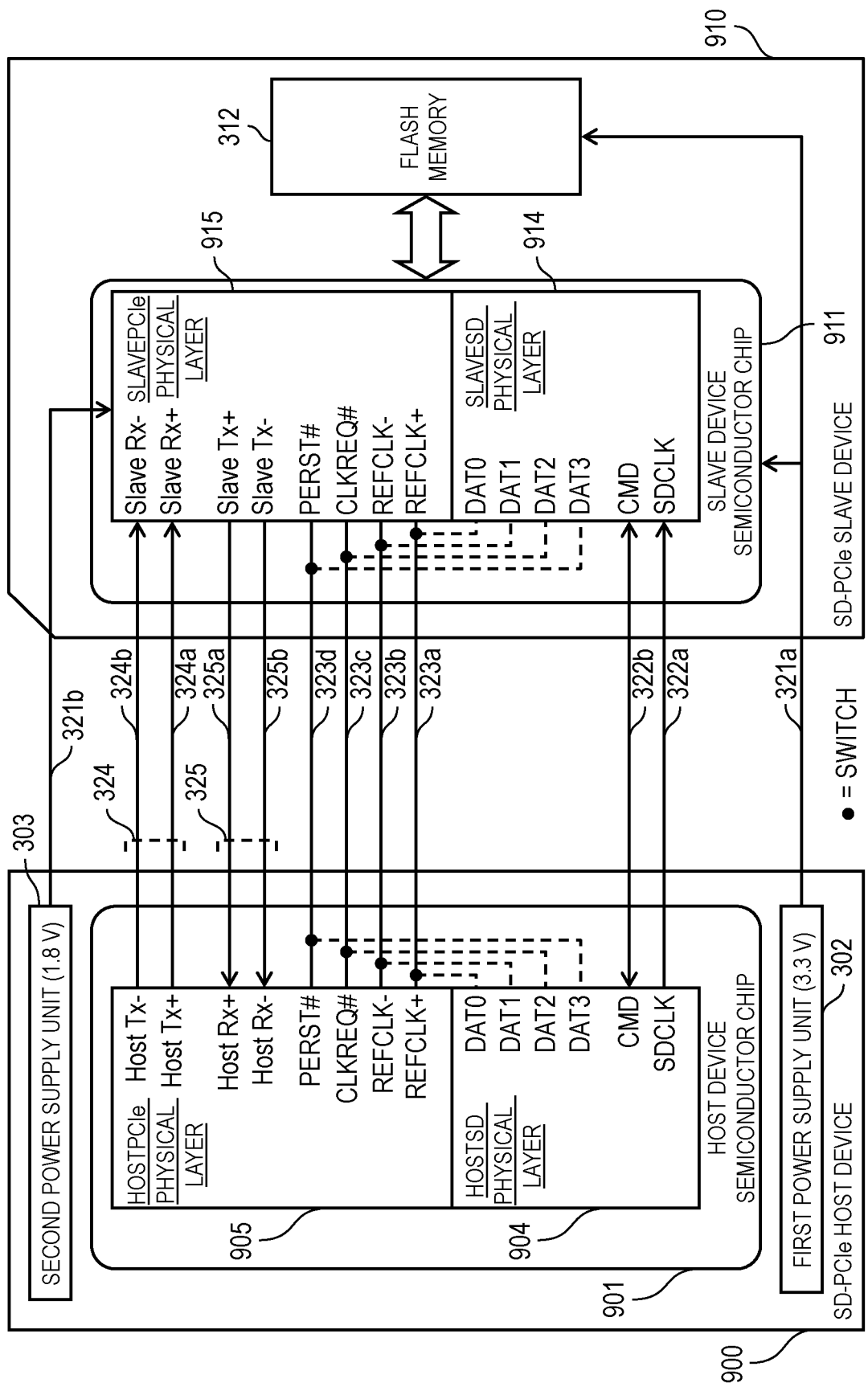
FIG. 12 is a diagram illustrating a connection mode of the SD-PCIe host device and the SD-PCIe slave device in a PCIe I/F mode in the first exemplary embodiment.

Further, FIGS. 11 and 12 are block diagrams illustrating connection modes of SD-PCIe host device 900 and SD-PCIe slave device 910 in an SD I/F mode and a PCIe I/F mode, respectively.

Hereinafter, differences between the first exemplary embodiment of the present invention and the conventional exemplary embodiment will be mainly described with reference to FIGS. 9 to 12.

In FIG. 10, SD I/F initialization stage 1011 is started after 3.3 V power is supplied via VDD1 line 321a (401) as in the conventional exemplary embodiment. In SD I/F initialization stage 1011, as in the conventional exemplary embodiment, in the SD I/F mode shown in FIG. 11, SDCLK is supplied via SDCLK line 322a (402), I/F confirmation command 403a is transmitted by host SD physical layer 904 via CMD line 322b, and I/F confirmation response 403b is transmitted by slave SD physical layer 914.

When host device semiconductor chip 901 determines that SD-PCIe slave device 910 supports a PCIe I/F by receiving I/F confirmation response 403b, SD I/F initialization stage 1011 is completed without stopping the supply of SDCLK, and the process shifts to PCIe I/F initialization stage 1012.

In PCIe I/F initialization stage 1012, in the PCIe mode shown in FIG. 12, 1.8 V power is supplied via VDD2 line 321b (405), REFCLK is supplied via REFCLK+/DAT0 line 323a and REFCLK-/DAT1 line 323b (406), PCIe initialization instruction packet 407a is transmitted by host PCIe physical layer 905 via high-speed downstream line 324, and PCIe initialization response packet 407b is transmitted by slave PCIe physical layer 915.

On the other hand, in the present exemplary embodiment, after SD I/F initialization stage 1011 is completed, the process shifts to flash memory initialization stage 1013 and the stage is executed in parallel with PCIe I/F initialization stage 1012 described above.

Operation in flash memory initialization stage 1013 will be described below.

Flash memory initialization stage 1013 is in the PCIe I/F mode shown in FIG. 12. However, SDCLK line 322a and CMD line 322b of the SD I/F are independent and are not shared with signal lines of the PCIe I/F. In other words, SD I/F communication using SDCLK line 322a and CMD line 322b can be performed even in the PCIe I/F mode.

In the present exemplary embodiment, in flash memory initialization stage 1013, host SD physical layer 904 supplies SDCLK via SDCLK line 322a and transmits flash memory initialization command 1001a via CMD line 322b.

Upon receiving flash memory initialization command 1001a via slave SD physical layer 914, slave device semiconductor chip 911 starts flash memory 312, reads firmware, and updates a table, as in the conventional exemplary embodiment. After the series of flash memory initialization is completed, slave SD physical layer 914 in slave device semiconductor chip 911 transmits flash memory initialization response 1001b to SD-PCIe host device 900 via CMD line 322b.

When host device semiconductor chip 901 detects that both PCIe I/F initialization stage 1012 and flash memory initialization stage 1013 have been completed, the process shifts to memory access stage 1014. This makes it possible to read from and write to the memory.

As described above, in the first exemplary embodiment of the present invention, PCIe I/F initialization stage 1012 and flash memory initialization stage 1013 are executed in parallel by using SDCLK line 322a and CMD line 322b line which can be used even in the PCIe I/F mode. As a result, it is possible to shorten time until data reading and writing to flash memory 312 (loading of application programs on SD-PCIe host device 900) can be started.

Figure 4:
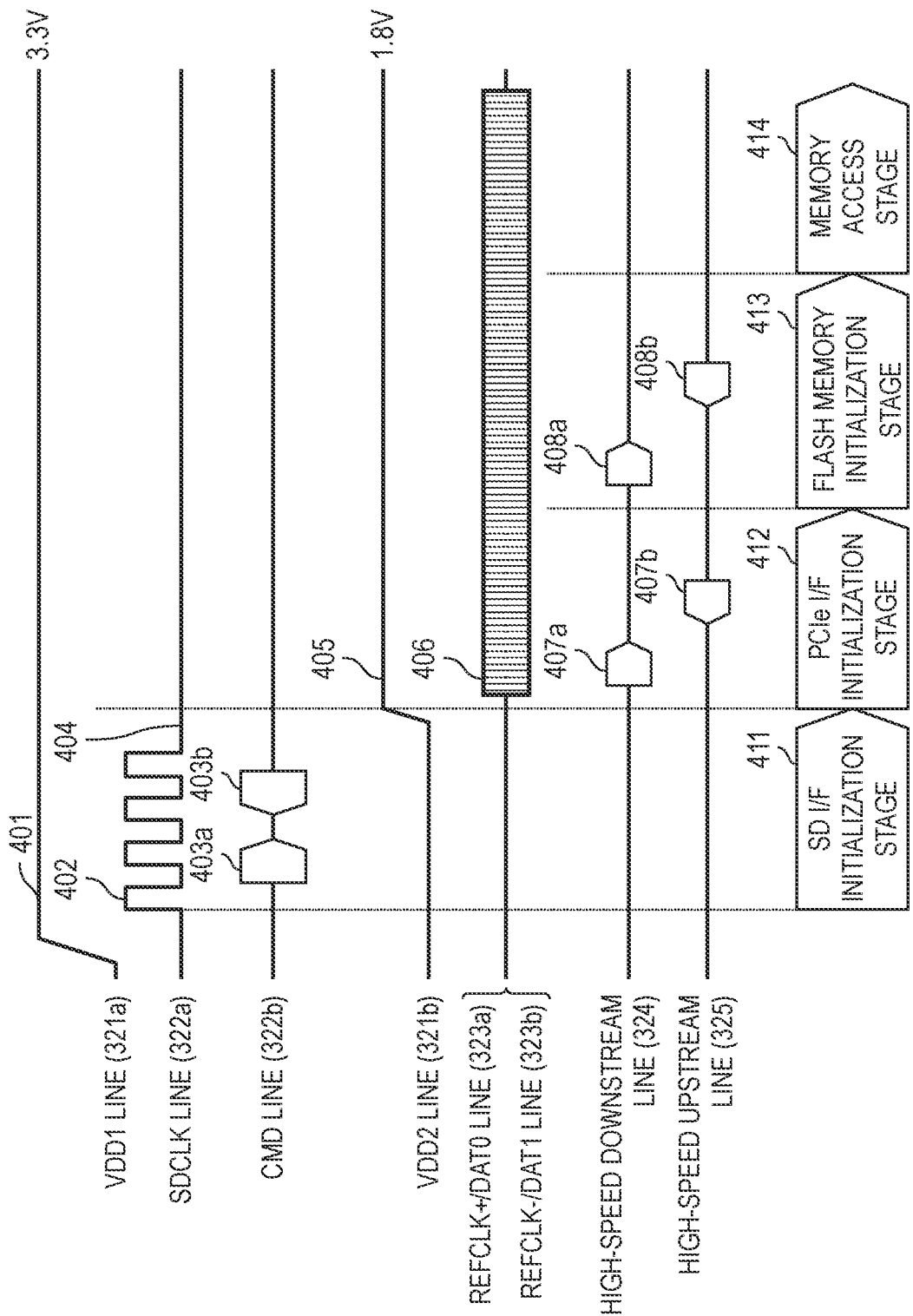
FIG. 4 is a diagram illustrating a procedure of initialization processing in the conventional memory system.
Figure 5:
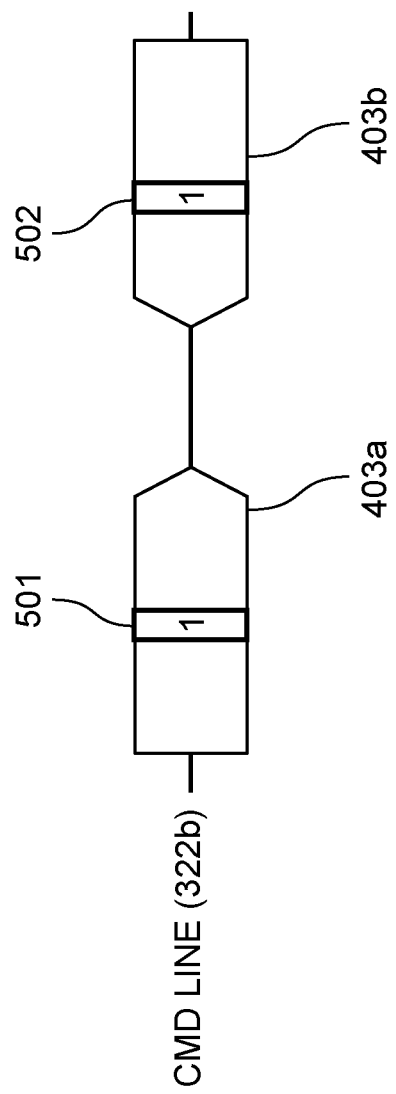
FIG. 5 is a diagram illustrating a detailed procedure of an SD I/F initialization stage.
Figure 6:
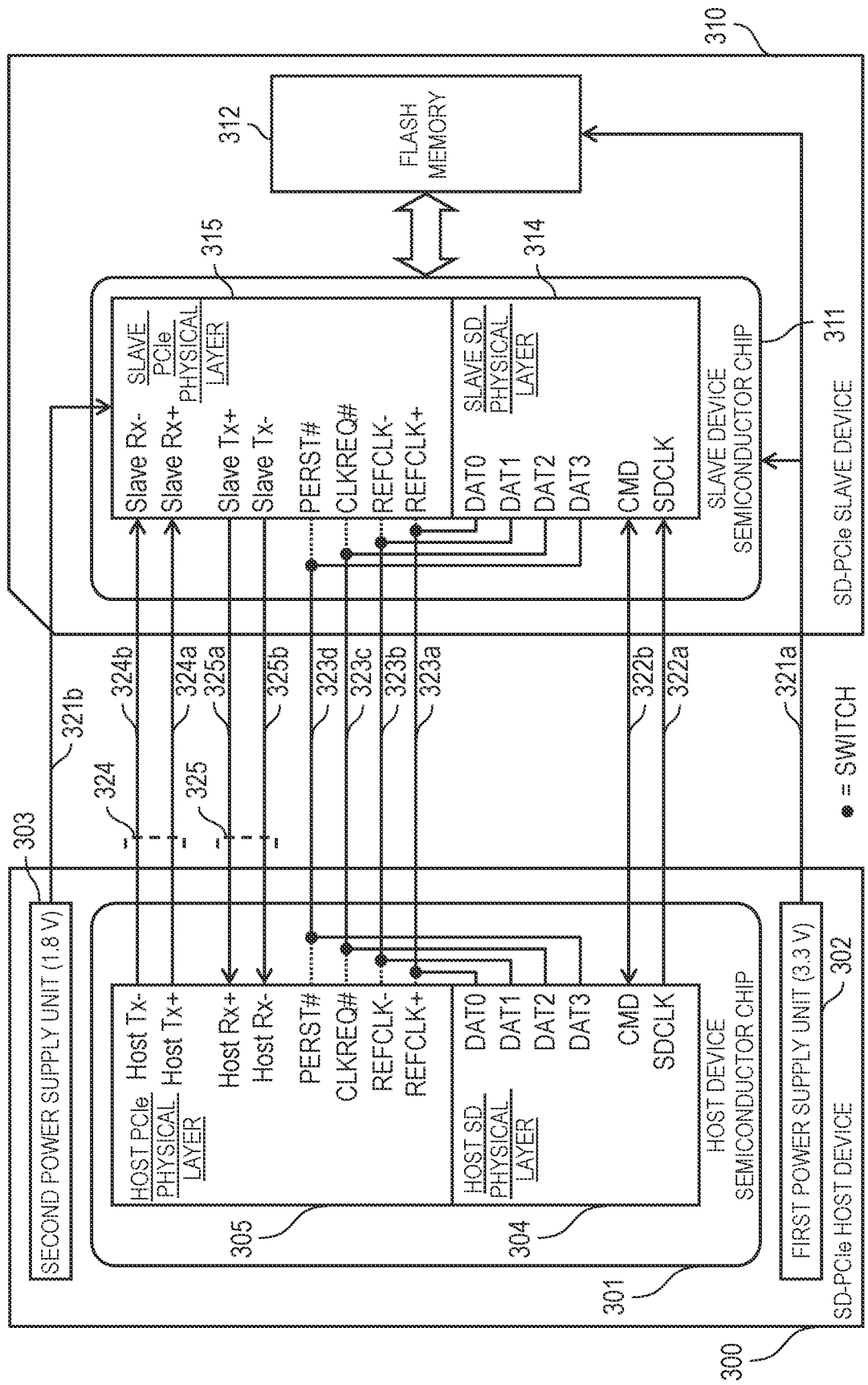
FIG. 6 is a diagram illustrating a connection mode of the SD-PCIe host device and the SD-PCIe slave device in an SD I/F mode in the conventional memory system.
Figure 7:
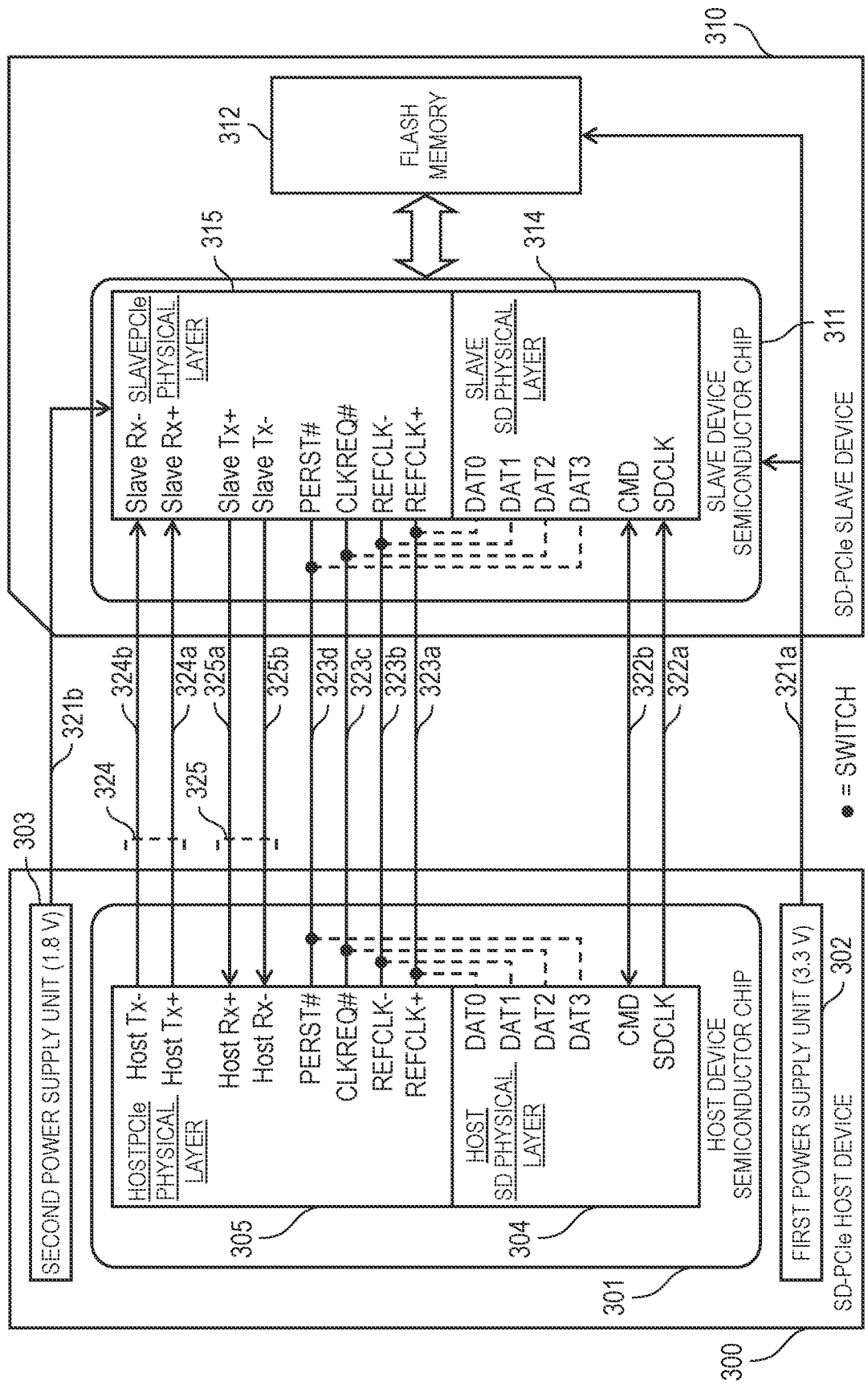
FIG. 7 is a diagram illustrating a connection mode of the SD-PCIe host device and the SD-PCIe slave device in a PCIe I/F mode in the conventional memory system.
Figure 8:
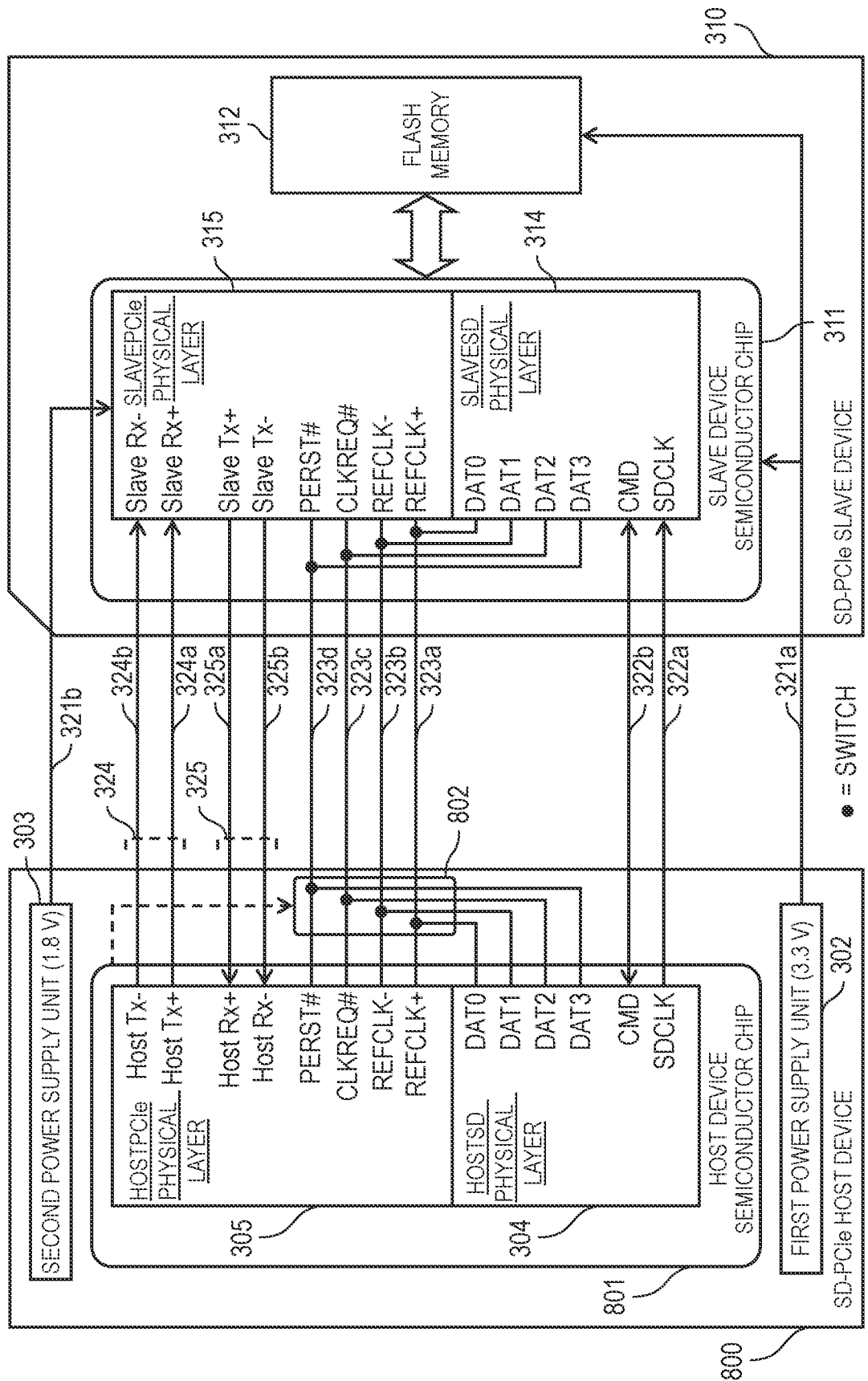
FIG. 8 is a diagram illustrating another configuration of an SD-PCIe host device in the conventional memory system.

For example, assuming that the SD I/F initialization stage takes 1 millisecond, the PCIe I/F initialization stage takes 150 milliseconds, and the flash memory initialization stage takes 200 milliseconds, it takes 1+150+200=351 milliseconds to be shifted to the memory access stage in the conventional exemplary embodiment shown in FIG. 4. On the other hand, in the exemplary embodiment of the present invention shown in FIG. 10, since the PCIe I/F initialization stage and the flash memory initialization stage can be executed in parallel, it takes 1+200 (longer required time of the PCIe I/F initialization stage and the flash memory initialization stage)=201 milliseconds, which can significantly reduce the time.

Note that, in the present exemplary embodiment, the time required for the flash memory initialization stage is longer than the time required for the PCIe I/F initialization stage, but the same effect can be obtained in the opposite case.

Second Exemplary Embodiment

Figure 13:
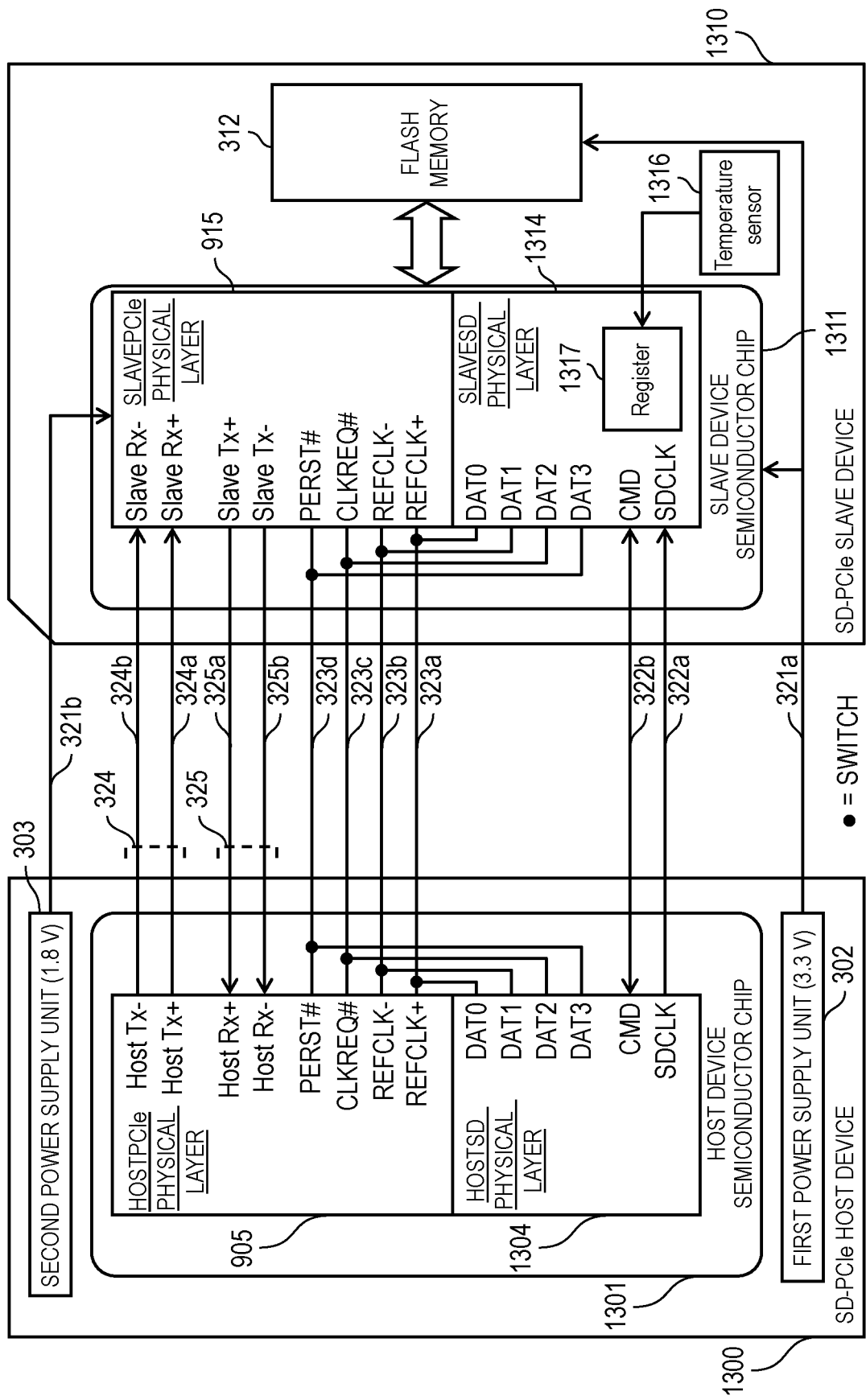
FIG. 13 is a diagram illustrating an SD-PCIe host device and an SD-PCIe slave device in a second exemplary embodiment.

FIG. 13 is a diagram illustrating a configuration of a memory system according to a second exemplary embodiment of the present invention. FIG. 13 shows SD-PCIe host device 1300, host device semiconductor chip 1301, host SD physical layer 1304, SD-PCIe slave device 1310, slave device semiconductor chip 1311, and slave SD physical layer 1314. SD-PCIe slave device 1310 has temperature sensor 1316. Further, slave SD physical layer 1314 has register 1317. Register 1317 periodically acquires temperature information of SD-PCIe slave device 1310 detected by at least temperature sensor 1316 and holds it in a predetermined area.

Figure 3:
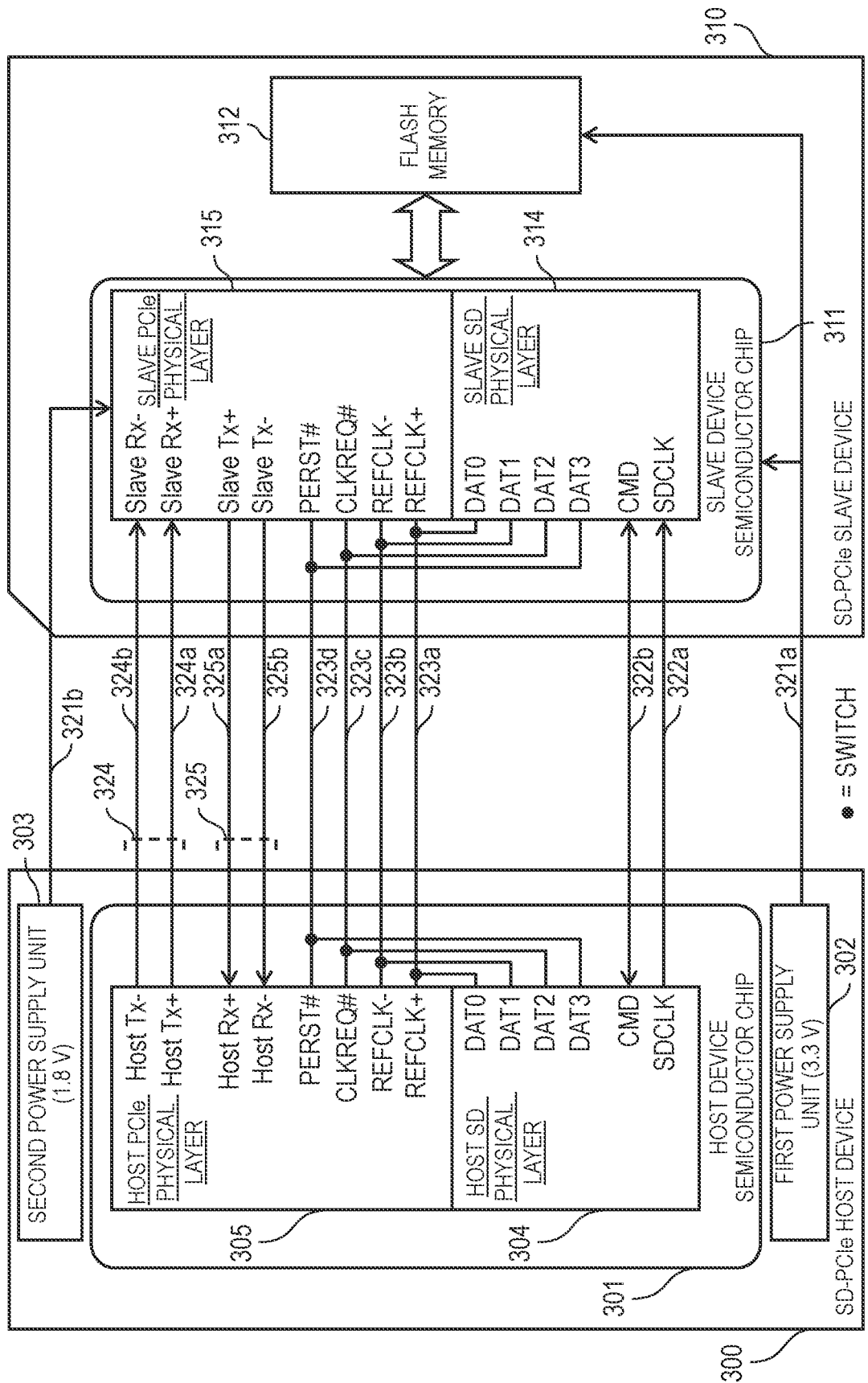
FIG. 3 is a diagram illustrating a conventional memory system including an SD-PCIe host device and an SD-PCIe slave device.

A connection mode of SD-PCIe host device 1300 and SD-PCIe slave device 1310 is the same as the connection mode in FIG. 3.

Figure 14:
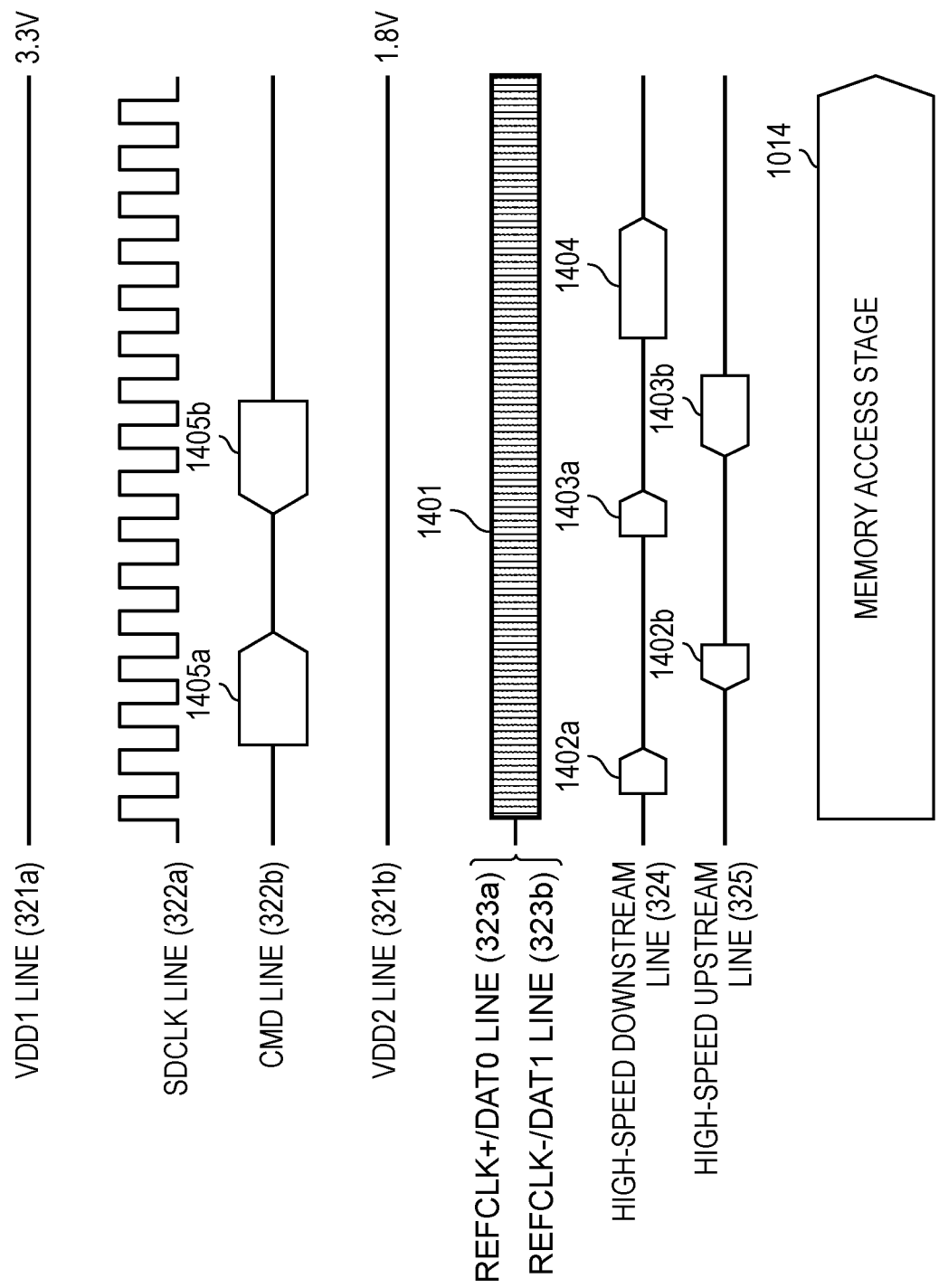
FIG. 14 is a diagram illustrating communication between the SD-PCIe host device and the SD-PCIe slave device in the second exemplary embodiment.
Figure 15:
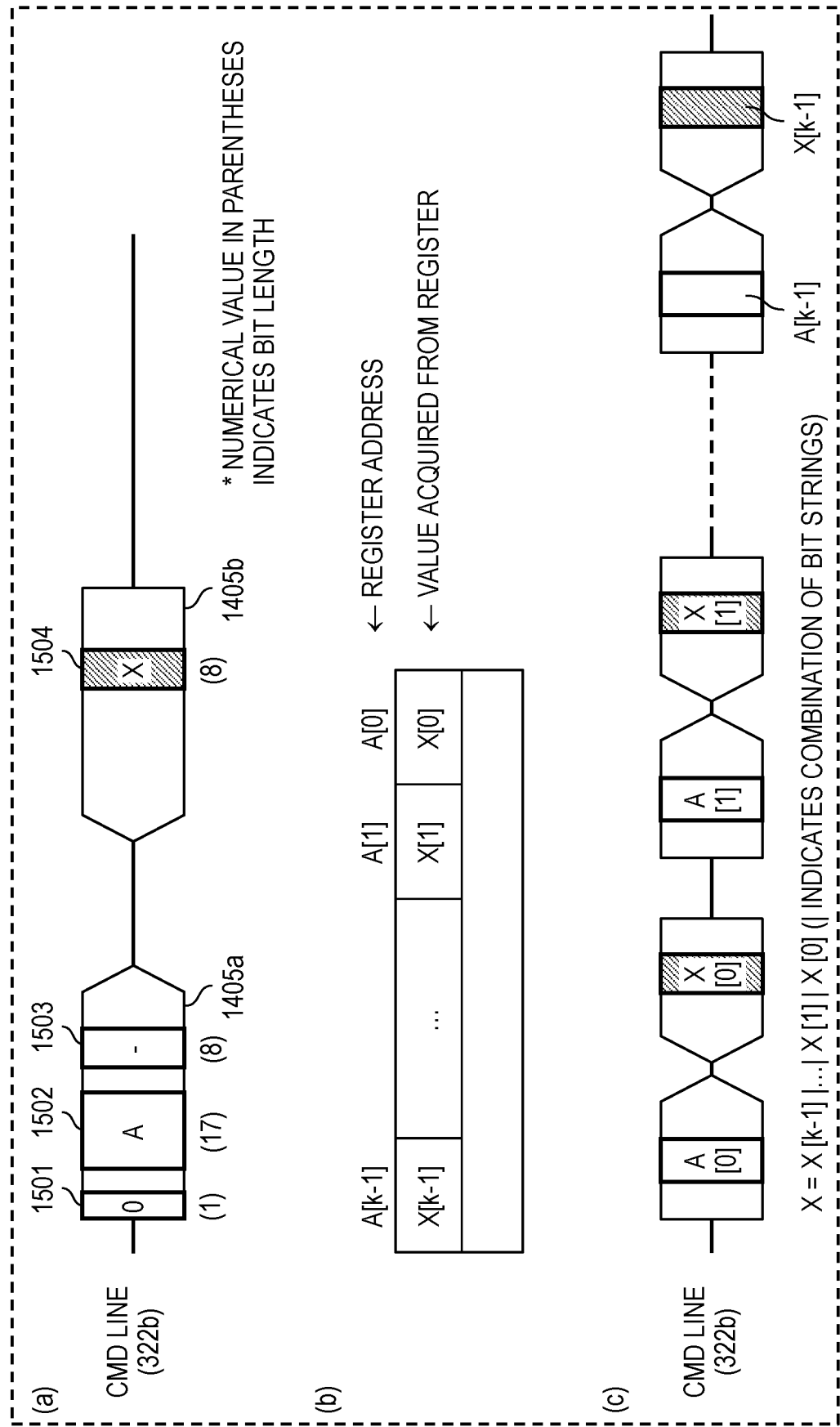
FIG. 15 is a diagram illustrating in detail a register access command and a register access response in the second exemplary embodiment.

FIG. 14 is a diagram illustrating communication between SD-PCIe host device 1300 and SD-PCIe slave device 1310 according to the second exemplary embodiment of the present invention, and FIG. 15 is a diagram illustrating details of communication on CMD line 322*b* in FIG. 14.

Hereinafter, the second exemplary embodiment of the present invention will be described with reference to FIGS. 13 to 15.

In the present exemplary embodiment, it is assumed that the initialization based on the procedure described in the first exemplary embodiment has been completed. In other words, both SD-PCIe host device 1300 and SD-PCIe slave device 1310 are in a PCIe I/F mode as in FIG. 12, initialization of both has been completed, and the process has shifted to memory access stage 1014.

In memory access stage 1014, SD-PCIe host device 1300 supplies REFCLK signal 1401 to SD-PCIe slave device 1310 via REFCLK+/DAT0 line 323*a* and REFCLK−/DAT1 line 323*b*. Then, SD-PCIe host device 1300 uses high-speed downstream line 324 to transmit various PCIe I/F packets to SD-PCIe slave device 1310, and SD-PCIe slave device 1310 uses high-speed upstream line 325 to transmit them to SD-PCIe host device 1300.

Main transmission/reception patterns on the PCIe I/F are as follows.

(1) Transmission of control instruction response packet 1402*b* from SD-PCIe slave device 1310 in response to transmission of control instruction packet 1402*a* from SD-PCIe host device 1300

(2) Transmission of read data packet 1403*b* from SD-PCIe slave device 1310 in response to transmission of read instruction packet 1403*a* from SD-PCIe host device 1300

(3) Transmission of write instruction and write data packet 1404 from SD-PCIe host device 1300

When SD-PCIe host device 1300 wants to acquire the temperature information of SD-PCIe slave device 1310, host SD physical layer 1304 in host device semiconductor chip 1301 transmits register access command 1405*a* to SD-PCIe slave device 1310 via CMD line 322*b* regardless of whether the packets are transmitted/received via the PCI I/F. Register access command 1405*a* includes Read/Write flag 1501 having a length of at least 1 bit, register address area 1502 having a length of 17 bits, and in-command data area 1503 having a length of 8 bits as shown in FIG. 15(*a*).

In the present exemplary embodiment, the temperature information held in register 1317 is read. Therefore, as shown in FIG. 15(*a*), "1" meaning Read is set in Read/Write flag 1501, and a start address "A" of the register in which the temperature information is stored is set in register address area 1502. Further, in the present exemplary embodiment, since data is not written to the register, no particular setting is made in in-command data area 1503 (a set value is regarded as Don't care).

Upon receiving register access command 1405*a*, slave SD physical layer 1314 reads temperature information "X" having a maximum length of 8 bits starting from the address "A" shown in register address area 1502, stores the temperature information in in-response data area 1504 having a length of 8 bits in register access response 1405*b*, and transmits the register access response to SD-PCIe host device 1300 via CMD line 322*b*.

Upon receiving register access response 1405*b*, host SD physical layer 1304 reads out the 8-bit length temperature information "X" stored in in-response data area 1504.

As described above, according to the present exemplary embodiment, the temperature information can be acquired independently of the PCIe I/F by using register access command 1405*a* and register access response 1405*b* of the SD I/F independent of the PCIe I/F. As a result, temperature information acquisition operation via the SD I/F is not affected by reading and writing data via the PCIe I/F, and conversely the temperature information acquisition operation via the SD I/F does not affect performance of reading and writing data via the PCIe I/F.

In the present exemplary embodiment, a data size that can be acquired by issuing register access command 1405*a* once is very small, i.e., 8 bits. However, a number of bits required to express the temperature information is not so large, and the temperature information is not updated frequently so that the present exemplary embodiment is sufficiently effective.

Note that even when data exceeding 8 bits (here, referred to as long bit data for convenience) is acquired from the register, it can be acquired by, for example, the following method in the present exemplary embodiment.

Predetermined long bit data X is divided into k elements such as X[0], X[1], . . . , X[k−1] by 8 bits from a lower bit side, and these are acquired from register address area 1502 having different addresses (A[0], A[1], . . . A[k−1]) as shown in FIG. 15(*b*). SD-PCIe host device 1300 sequentially issues register access command 1405*a* in which register address area 1502 is changed to A[0] to A[k−1] as shown in FIG. 15(*c*), and acquires values from X[0] to X[k−1]. After that, SD-PCIe host device 1300 constructs long bit data X by combining the acquired values from X[0] to X[k−1] in order, that is, from an arithmetic expression X=X[k−1]| . . . |X[1]|X[0] (where | indicates combination of bit strings).

Note that the bit lengths of register address area 1502, in-command data area 1503, and in-response data area 1504 in the present exemplary embodiment are examples and are not particularly fixed.

Further, in the present exemplary embodiment, a case of acquiring the temperature information has been described, but other information related to SD-PCIe slave device 1310, for example, information on a number of rewrites for each write block of flash memory 312 can also be acquired. In this case, SD-PCIe host device 1300 can prompt a user to replace SD-PCIe slave device 1310 by estimating approximate life expectancy of the flash memory from the information on the number of rewrites.

Third Exemplary Embodiment

Figure 16:
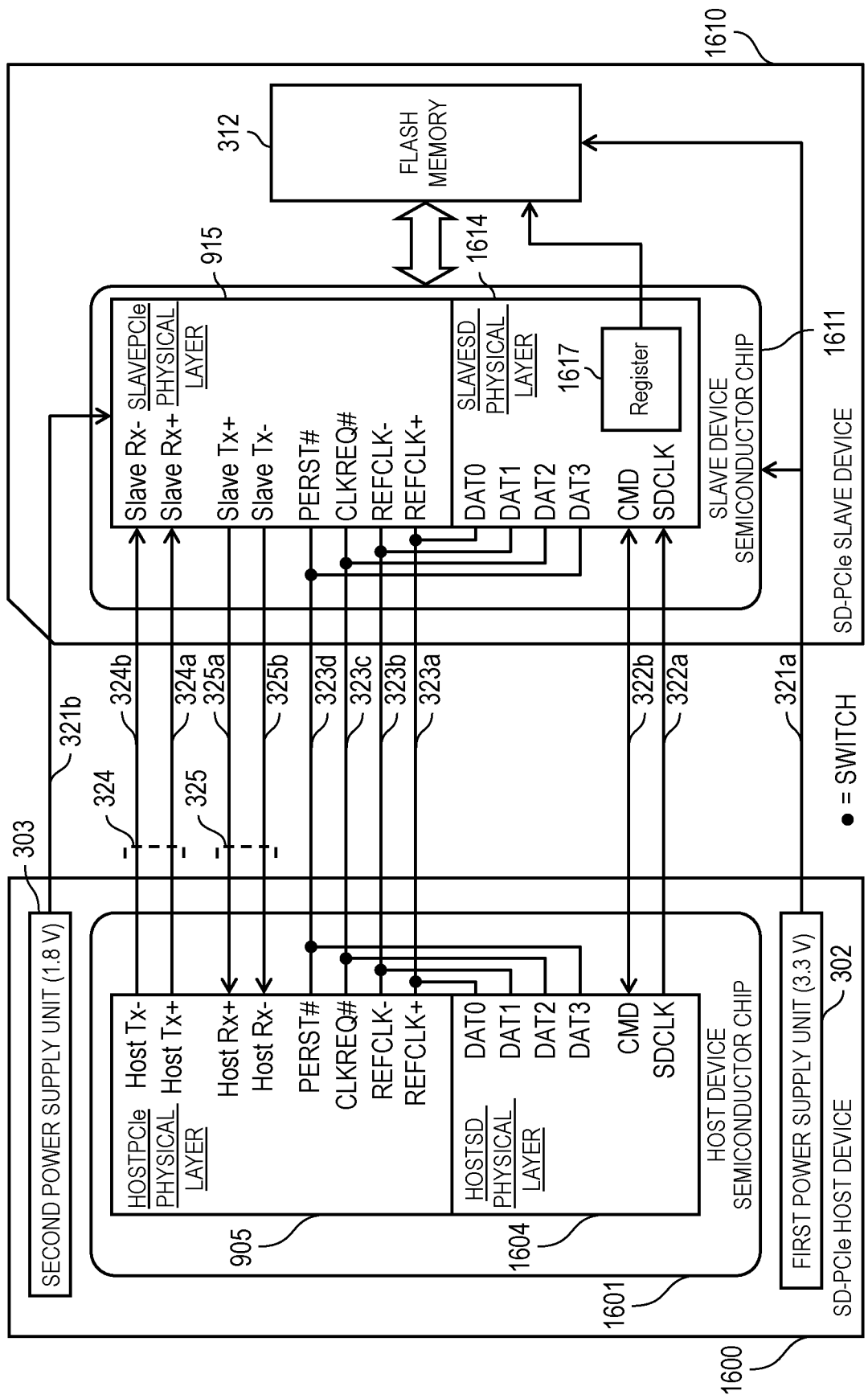
FIG. 16 is a diagram illustrating an SD-PCIe host device and an SD-PCIe slave device in a third exemplary embodiment.

FIG. 16 is a diagram illustrating a configuration of a memory system according to a third exemplary embodiment of the present invention. FIG. 16 shows SD-PCIe host device 1600, host device semiconductor chip 1601, host SD physical layer 1604, SD-PCIe slave device 1610, slave device semiconductor chip 1611, and slave SD physical layer 1614. Slave SD physical layer 1614 has register 1617. Register 1617 has a function of sequentially writing data to flash memory 312 by designating a predetermined write address.

A connection mode of SD-PCIe host device 1600 and SD-PCIe slave device 1610 is the same as the connection mode in FIG. 3.

Figure 17:
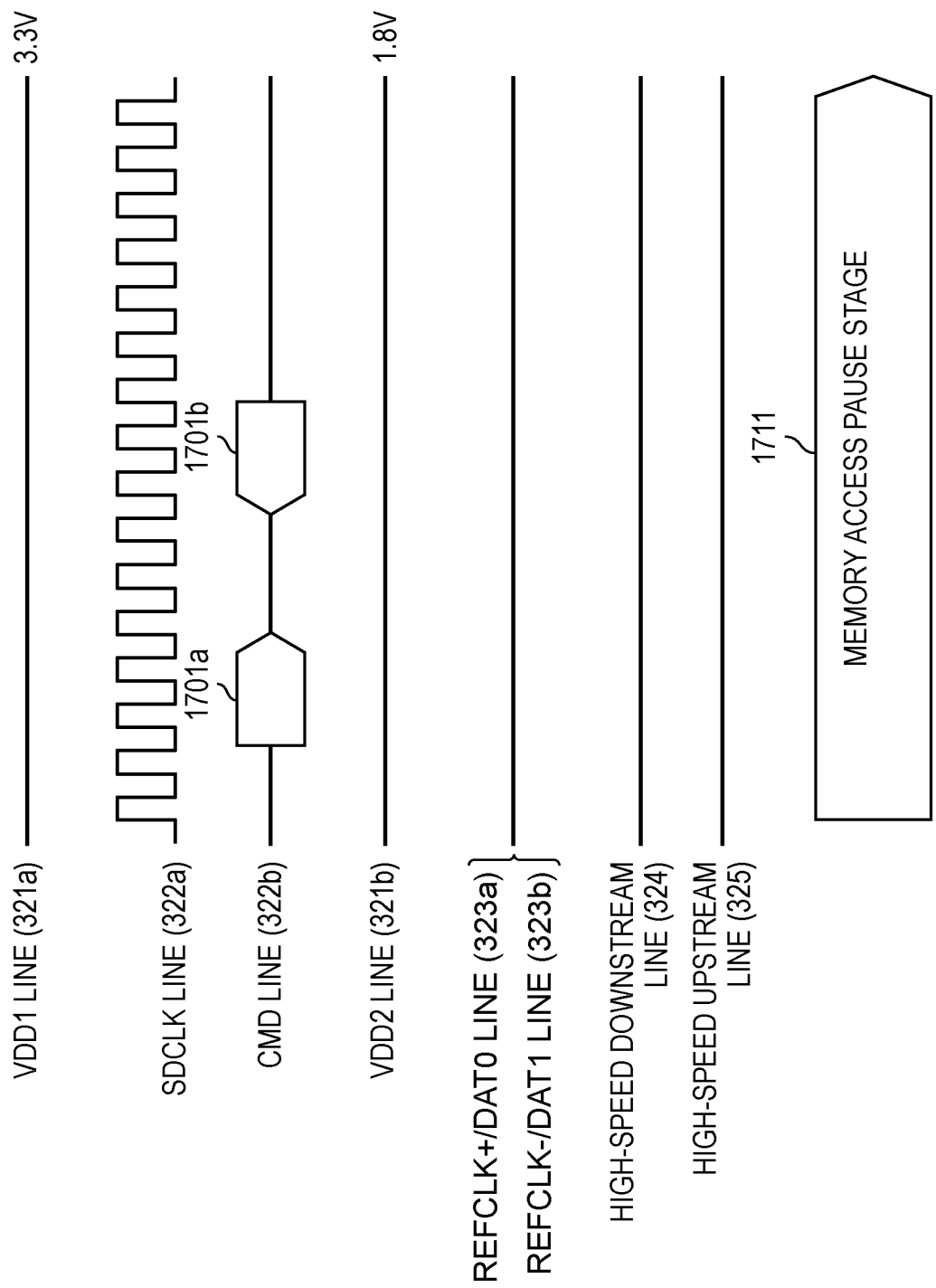
FIG. 17 is a diagram illustrating communication between the SD-PCIe host device and the SD-PCIe slave device in the third exemplary embodiment.
Figure 18:
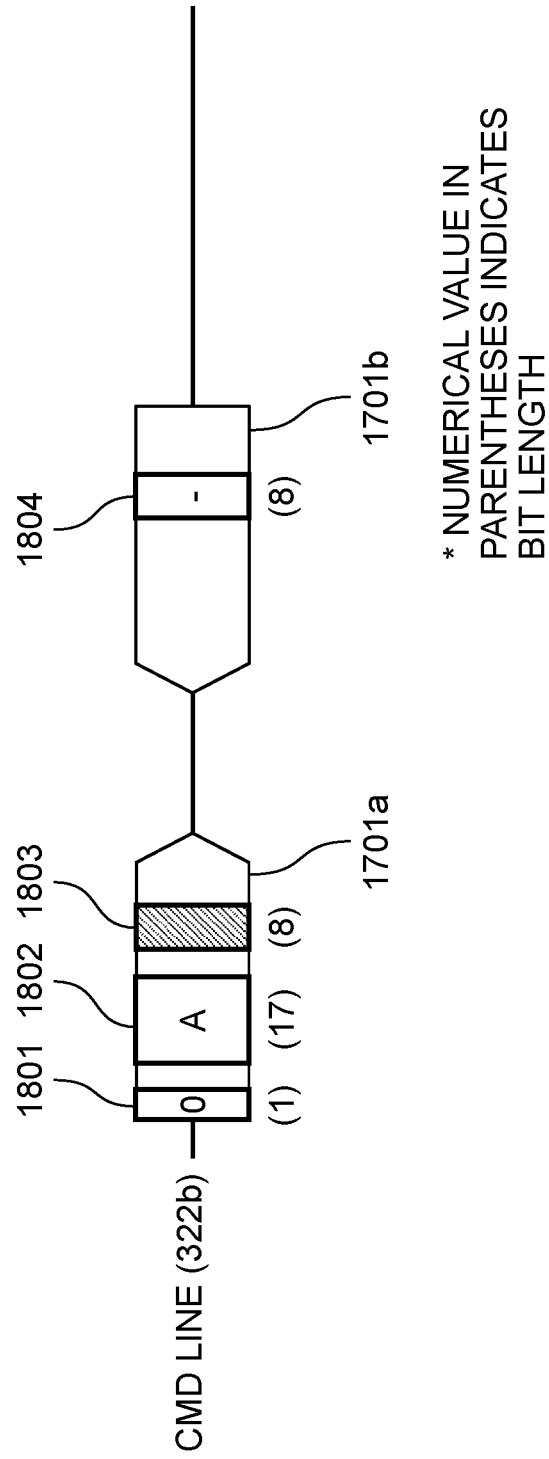
FIG. 18 is a diagram illustrating in detail a register access command and a register access response in the third exemplary embodiment.

FIG. 17 is a diagram illustrating communication between SD-PCIe host device 1600 and SD-PCIe slave device 1610 according to the third exemplary embodiment of the present invention, and FIG. 18 is a diagram illustrating details of communication on CMD line 322b in FIG. 17.

Hereinafter, the third exemplary embodiment of the present invention will be described with reference to FIGS. 16 to 18.

Also in the present exemplary embodiment, it is assumed that the initialization based on the procedure described in the first exemplary embodiment has been completed. Furthermore, for the purpose of reducing power consumption, it is assumed that the process has shifted to memory access pause stage 1711 in which REFCLK is not supplied according to a predetermined procedure.

At this time, both SD-PCIe host device 1600 and SD-PCIe slave device 1610 are in a PCIe I/F mode as in FIG. 12, but since the process is in memory access pause stage 1711, SD-PCIe host device 1600 stops supply of REFCLK via REFCLK+/DAT0 line 323a and REFCLK−/DAT1 line 323b. At this time, SD-PCIe host device 1600 and SD-PCIe slave device 1610 cannot transmit control packets and data packets via high-speed downstream line 324 and high-speed upstream line 325, respectively.

As described above, even when the PCI I/F cannot be used for the purpose of reducing power consumption, SD-PCIe host device 1600 can write predetermined data to flash memory 312 in SD-PCIe slave device 1610 according to the present exemplary embodiment.

Specifically, as shown in FIG. 17, host SD physical layer 1604 in host device semiconductor chip 1601 transmits register access command 1701a to SD-PCIe slave device 1610 via CMD line 322b independent of the PCIe I/F. Register access command 1701a includes Read/Write flag 1801 having a length of at least 1 bit, a register address area 1802 having a length of 17 bits, and an in-command data area 1803 having a length of 8 bits as shown in FIG. 18.

In the present exemplary embodiment, since the predetermined data is written to flash memory 312 via register 1617, "0" meaning Write is set in Read/Write flag 1801, and a predetermined address "A" for writing to flash memory 312 is set in register address area 1802. Furthermore, a value to be written to flash memory 312 is set in in-command data area 1803.

When slave SD physical layer 1614 that has received register access command 1701a detects that the address "A" indicated by register address area 1802 is a predetermined address indicating writing to flash memory 312, the slave SD physical layer writes 8-bit length data stored in in-command data area 1803 to flash memory 312.

After that, slave device semiconductor chip 1611 transmits register access response 1701b to SD-PCIe host device 1600 via CMD line 322b. At this time, no particular setting is made in in-response data area 1804 in register access response 1701b (a set value is regarded as Don't care).

As described above, according to the present exemplary embodiment, by using register access command 1701a and register access response 1701b of the SD I/F independent of the PCIe I/F, data can be written to flash memory 312 even in a state where the process is shifted to memory access pause stage 1711 for the purpose of reducing power consumption.

In the present exemplary embodiment, a data size that can be written by issuing register access command 1701a once is very small, i.e., 8 bits. However, when an amount of information to be written per unit time is small such as log data, data writing via the SD I/F described in the present exemplary embodiment is sufficiently effective. Even if the data to be written is long bit data exceeding 8 bits, the data writing can be achieved by dividing the long bit data in 8-bit units and defining a register address area for each, as in the first exemplary embodiment.

Further, in the present exemplary embodiment, a case of writing to flash memory 312 has been described, but it is also possible to change a predetermined set value of register 1617 by setting an appropriate address in register address area 1802. Furthermore, as in the second exemplary embodiment, by setting "1" meaning Read in Read/Write flag 1801 and setting an appropriate address in register address area 1802, it is also possible to read data from flash memory 312 or to read a register value in a predetermined area of register 1617.

Furthermore, in SD-PCIe slave device 1610 according to the present exemplary embodiment, in the data writing via the PCIe I/F or the data writing via the SD I/F in the SD I/F mode, data is written to flash memory 312 in a relatively large writing unit. On the other hand, in the data writing via the SD I/F (only SDCLK line 322a and CMD line 322b are used) in the PCIe mode as in the present exemplary embodiment, the data is written to the flash memory 312 in a relatively small writing unit.

Figure 19:
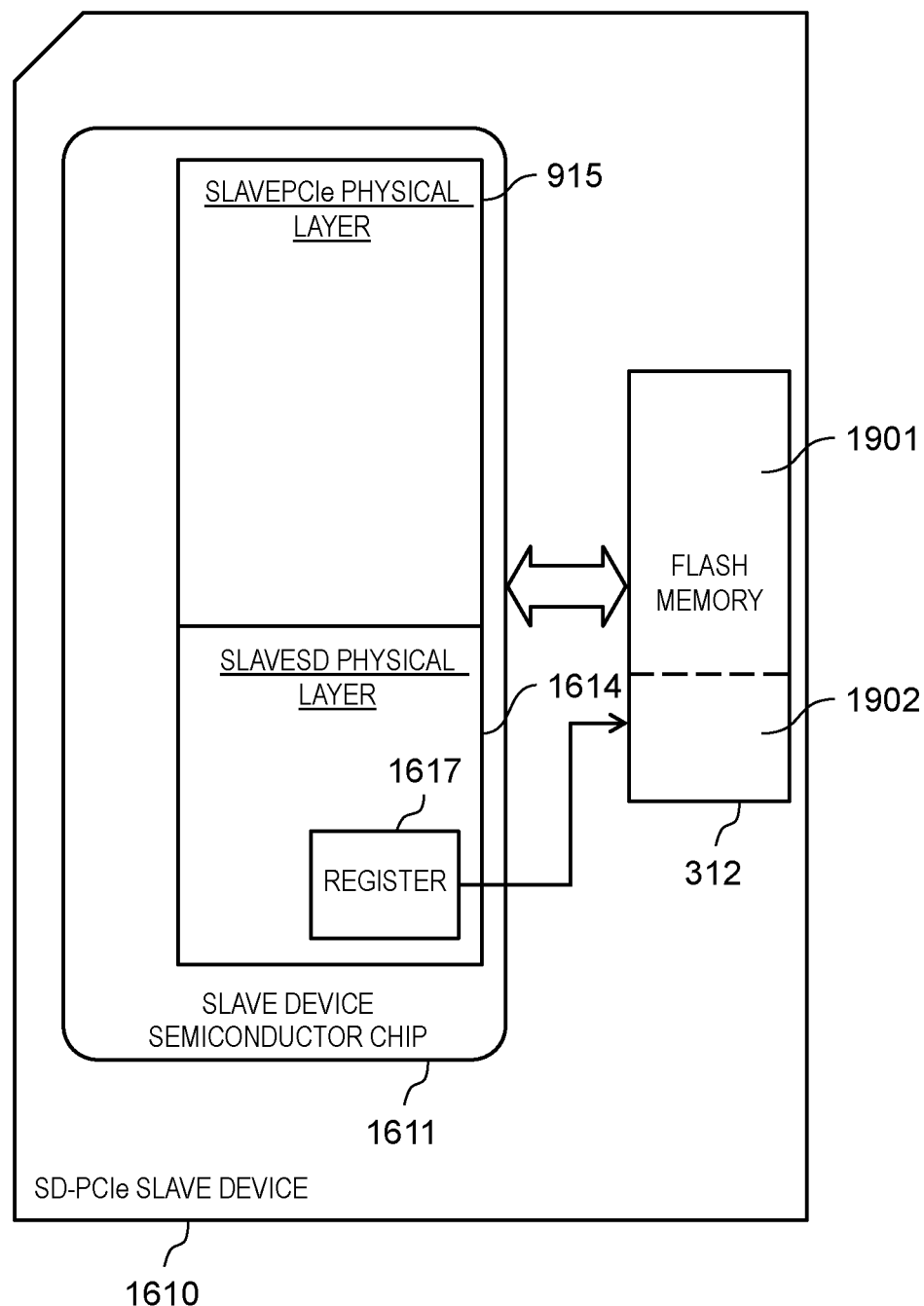
FIG. 19 is a diagram illustrating an example of area division of a flash memory in the third exemplary embodiment.

At this time, as shown in FIG. 19, flash memory 312 is divided into large block size area 1901 suitable for a large writing unit and small block size area 1902 suitable for a small writing unit. Then, data is written to large block size area 1901 in the data writing via the PCIe I/F or the data writing via the SD I/F in the SD I/F mode, and data is written to small block size area 1902 in the data writing via the SD I/F in the PCIe mode. As a result, efficient writing to flash memory 312 can be achieved, which can lead to a longer life of flash memory 312.

Fourth Exemplary Embodiment

Figure 20:
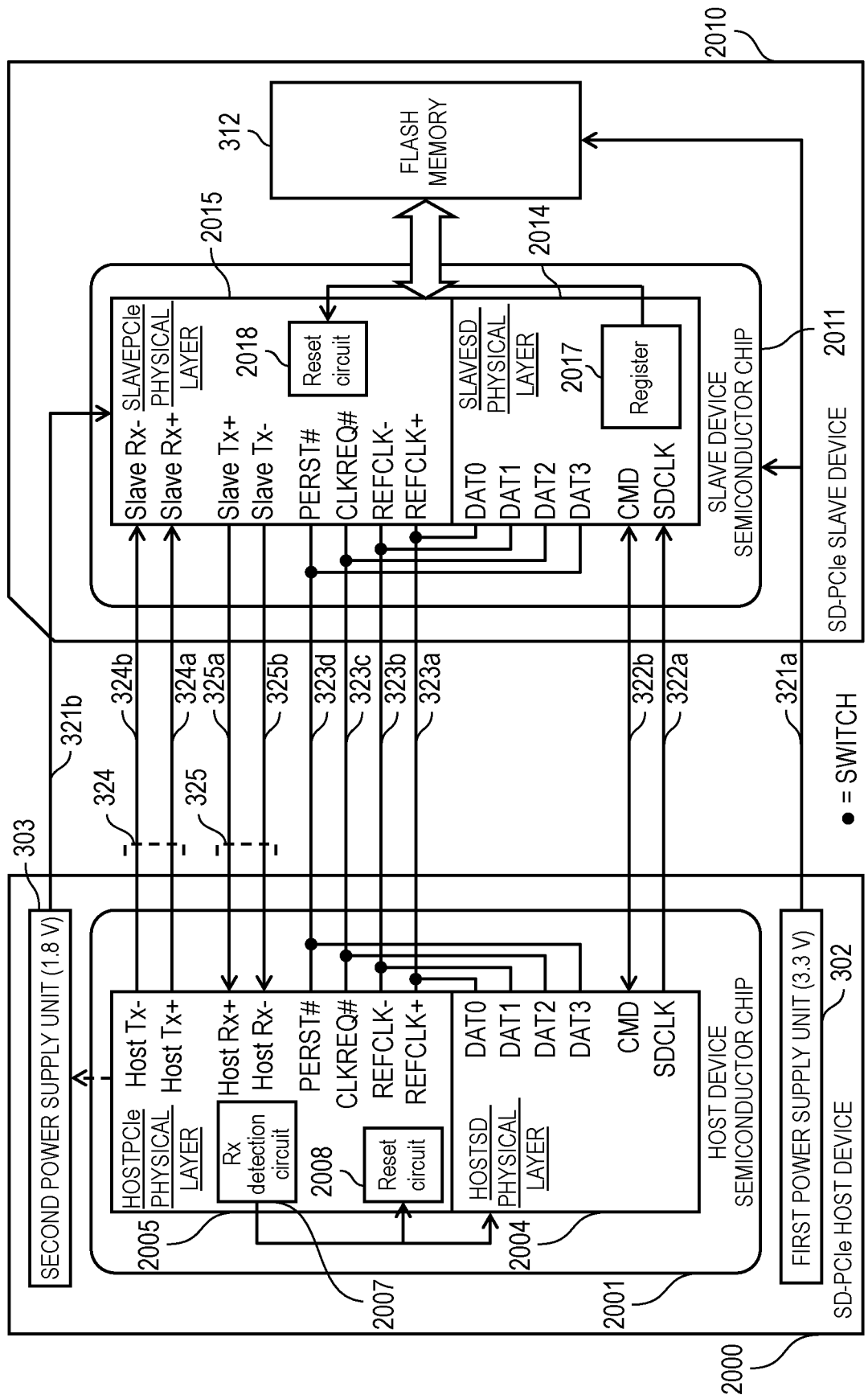
FIG. 20 is a diagram illustrating an SD-PCIe host device and an SD-PCIe slave device in a fourth exemplary embodiment.

FIG. 20 is a diagram illustrating a configuration of a memory system according to a fourth exemplary embodiment of the present invention. FIG. 20 shows SD-PCIe host device 2000, host device semiconductor chip 2001, host SD physical layer 2004, host PCIe physical layer 2005, SD-PCIe slave device 2010, slave device semiconductor chip 2011, slave SD physical layer 2014, and slave PCIe physical layer 2015. Host PCIe physical layer 2005 includes Rx detection circuit 2007 and reset circuit 2008. Slave SD physical layer 2014 includes register 2017. Slave PCIe physical layer 2015 includes reset circuit 2018. Register 2017 enables reset circuit 2018 in slave PCIe physical layer 2015 by writing "1" to a predetermined address area.

A connection mode of SD-PCIe host device 2000 and SD-PCIe slave device 2010 is the same as the connection mode in FIG. 3.

Figure 21:
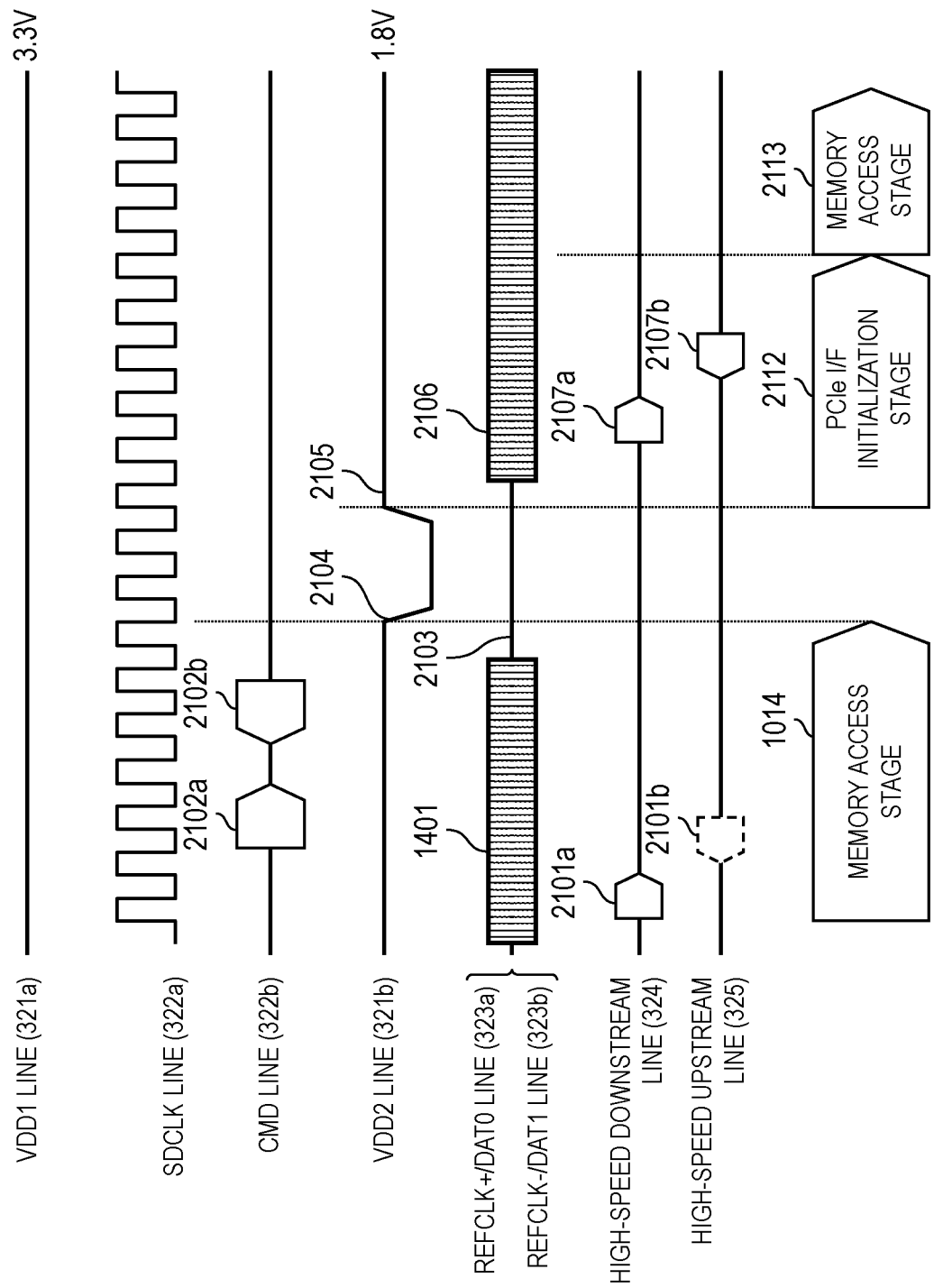
FIG. 21 is a diagram illustrating communication between the SD-PCIe host device and the SD-PCIe slave device in the fourth exemplary embodiment.

FIG. 21 is a diagram illustrating communication between SD-PCIe host device 2000 and SD-PCIe slave device 2010 according to the fourth exemplary embodiment of the present invention, and FIG. 22 is a diagram illustrating details of communication on CMD line 322b in FIG. 21.

Hereinafter, the fourth exemplary embodiment of the present invention will be described with reference to FIGS. 20 to 22.

In the present exemplary embodiment, as in the second exemplary embodiment, both SD-PCIe host device 2000 and SD-PCIe slave device 2010 are in a PCIe I/F mode as in FIG. 12, initialization of both has been completed, and the process has shifted to memory access stage 1014. Further, SD-PCIe host device 2000 supplies REFCLK signal 1401 to SD-PCIe slave device 2010 via REFCLK+/DAT0 line 323a and REFCLK−/DAT1 line 323b.

In the present exemplary embodiment, when some abnormality occurs in the PCIe I/F, even if SD-PCIe host device 2000 transmits control instruction packet 2101a to SD-PCIe slave device 2010 using high-speed downstream line 324, expected control instruction response packet 2101b cannot be received. In this way, when Rx detection circuit 2007 in host PCIe physical layer 2005 cannot receive the packet that should be received, host device semiconductor chip 2001 attempts to reset the PCIe I/F as described below.

In order to reset slave device semiconductor chip 2011, Rx detection circuit 2007 instructs host SD physical layer 2004 to transmit register access command 2102a to SD-PCIe slave device 2010 via CMD line 322b independent of the PCIe I/F to host SD physical layer 2004. Register access command 2102a includes Read/Write flag 2201 having a length of at least 1 bit, register address area 2202 having a length of 17 bits, and in-command data area 2203 having a length of 8 bits as shown in FIG. 22.

In the present exemplary embodiment, since "1" is set at the predetermined address of register 2017 in slave SD physical layer 2014, "0" meaning Write is set in Read/Write flag 2201, and a predetermined address "A" corresponding to the reset instruction is set in register address area 2202. Furthermore, "1" is set in in-command data area 2203.

Since the address "A" shown in register address area 2202 corresponds to the reset instruction and "1" is set in in-command data area 2203, slave SD physical layer 2014 that has received register access command 2102a notifies reset circuit 2018 in slave PCIe physical layer 2015 of the reset instruction. Reset circuit 2018 that has received the reset instruction from register 2017 resets slave PCIe physical layer 2015.

After that, slave device semiconductor chip 2011 transmits register access response 2102b to SD-PCIe host device 2000 via CMD line 322b. At this time, no particular setting is made in in-response data area 2204 in register access response 2102b (a set value is regarded as Don't care). With this, SD-PCIe slave device 2010 ends memory access stage 1014.

Furthermore, Rx detection circuit 2007 in host PCIe physical layer 2005 similarly notifies reset circuit 2008 in host PCIe physical layer 2005 of the reset instruction. Upon receiving the reset instruction from Rx detection circuit 2007, reset circuit 2008 resets host PCIe physical layer 2005 as follows.

Host PCIe physical layer 2005 stops supply of REFCLK signal 1401 via REFCLK+/DAT0 line 323a and REFCLK−/DAT1 line 323b (2103). that is supplied to SD-PCIe slave device 2010 Subsequently second power supply unit 303 is instructed to stop supply of 1.8 V power via VDD2 line 321b (2104). With this, SD-PCIe host device 2000 ends memory access stage 1014.

After a predetermined time has elapsed, host PCIe physical layer 2005 instructs second power supply unit 303 to resume the supply of 1.8 V power via VDD2 line 321b (2105). As a result, the process shifts to PCIe I/F initialization stage 2112.

Subsequently, the supply of REFCLK signal 1401 is resumed via REFCLK+/DAT0 line 323a and REFCLK−/DAT1 line 323b (2106).

After that, as in the first exemplary embodiment, host device semiconductor chip 2001 transmits PCIe initialization instruction packet 2107a to SD-PCIe slave device 2010, and slave device semiconductor chip 2011 transmits PCIe initialization response packet 2107b to SD-PCIe host device 2000. When initialization of a PCIe bus is completed, the process shifts from PCIe I/F initialization stage 2112 to memory access stage 2113.

As described above, according to the present exemplary embodiment, it is possible to reset the PCIe I/F fallen into an abnormal state by the SD I/F independent of the PCIe I/F. If the SD I/F is not available, it is necessary to reset entire SD-PCIe host device 2000 and SD-PCIe slave device 2010. In this case, it is also necessary to initialize flash memory 312, and time until normal recovery becomes longer.

Note that it is also possible to transmit and receive a PERST# signal for resetting the PCIe I/F via PERST#/DAT3 line 323d. However, when host PCIe physical layer 2005 or slave PCIe physical layer 2015 falls into an abnormal state, there is no guarantee that the PERST# signal can be transmitted and received correctly. Therefore, it is preferable to use the present exemplary embodiment.

Note that, in the present exemplary embodiment, an example in which reset circuit 2018 is operated by writing "1" to the predetermined address of register 2017 to reset slave PCIe physical layer 2015 has been described. Additionally, writing "1" to the predetermined address of register 2017 can also be used to change some settings, such as changing an operation mode of slave device semiconductor chip 2011.

Further, in the second to fourth exemplary embodiments, since the data transmission/reception on the SD I/F does not depend on the data transmission/reception on the PCIe I/F, both I/Fs can be designed independently.

INDUSTRIAL APPLICABILITY

The present disclosure can be applied to a slave device such as an SD memory card and a corresponding host device, which have both a low-speed I/F and a high-speed I/F, and a memory system including the host device and the slave device.

REFERENCE MARKS IN THE DRAWINGS

100: conventional SD card
200: SD-PCIe card
300: SD-PCIe host device
301: host device semiconductor chip
302: first power supply unit
303: second power supply unit
304: host SD physical layer 305: host PCIe physical layer
310: SD-PCIe slave device
311: slave device semiconductor chip
312: flash memory
314: slave SD physical layer
315: slave PCIe physical layer
321a: VDD1 line
321b: VDD2 line
322a: SDCLK line
322b: CMD line
323a: REFCLK+/DAT0 line
323b: REFCLK−/DAT1 line
323c: CLKREQ#/DAT2 line
323d: PERST#/DAT3 line
324: high-speed downstream line
324a: high-speed downstream+ line
324b: high-speed downstream− line
325: high-speed upstream line
325a: high-speed upstream+ line
325b: high-speed upstream− line
403a: I/F confirmation command
403b: I/F confirmation response
407a: PCIe initialization instruction packet
407b: PCIe initialization response packet
408a: flash memory initialization instruction packet
408b: flash memory initialization response packet
411: SD I/F initialization stage
412: PCIe I/F initialization stage
413: flash memory initialization stage
414: memory access stage
501: PCIe support flag
502: PCIe support flag
800: SD-PCIe host device
801: host device semiconductor chip
802: switch group
900: SD-PCIe host device
901: host device semiconductor chip
904: host SD physical layer
905: host PCIe physical layer
910: SD-PCIe slave device
911: slave device semiconductor chip
914: slave SD physical layer
915: slave PCIe physical layer
1001a: flash memory initialization command
1001b: flash memory initialization response
1011: SD I/F initialization stage
1012: PCIe I/F initialization stage
1013: flash memory initialization stage
1014: memory access stage
1300: SD-PCIe host device
1301: host device semiconductor chip
1304: host SD physical layer
1310: SD-PCIe slave device
1311: slave device semiconductor chip
1314: slave SD physical layer
1316: temperature sensor
1317: register
1402a: control instruction packet
1402b: control instruction response packet
1403a: read instruction packet
1403b: read data packet
1404: write instruction and write data packet
1405a: register access command
1405b: register access response
1501: Read/Write flag
1502: register address area
1503: in-command data area
1504: in-response data area
1600: SD-PCIe host device
1601: host device semiconductor chip
1604: host SD physical layer
1610: SD-PCIe slave device
1611: slave device semiconductor chip
1614: slave SD physical layer
1617: register
1701a: register access command
1701b: register access response
1711: memory access pause stage
1801: Read/Write flag
1802: register address area
1803: in-command data area
1804: in-response data area
1901: large block size area
1902: small block size area
2000: SD-PCIe host device
2001: host device semiconductor chip
2004: host SD physical layer
2005: host PCIe physical layer
2007: Rx detection circuit
2008: reset circuit
2010: SD-PCIe slave device
2011: slave device semiconductor chip
2014: slave SD physical layer
2015: slave PCIe physical layer
2017: register
2018: reset circuit
2101a: control instruction packet
2101b: control instruction response packet
2102a: register access command
2102b: register access response
2107a: PCIe initialization instruction packet
2107b: PCIe initialization response packet
2112: PCIe I/F initialization stage
2113: memory access stage
2201: Read/Write flag
2202: register address area
2203: in-command data area
2204: in-response data area

The invention claimed is:

1. A communication device comprising:
a first interface including first signal lines;
a second interface including second signal lines, one of the first signal lines and one of the second signal lines being shared by the first interface and the second interface as a common signal line;
a memory connected to both the first interface and the second interface; and
a semiconductor chip configured to execute (i) a first interface initialization to initialize the first interface using at least one of the first signal lines, (ii) a second interface initialization to initialize the second interface using at least one of the second signal lines, and (iii) a memory initialization to initialize the memory via the first interface by using at least one of the first signal lines other than the common signal line;
wherein the semiconductor chip executes (ii) the second interface initialization and (iii) the memory initialization in parallel following (i) the first interface initialization.

2. The communication device according to claim 1, wherein the first interface is a Secure Digital (SD) interface.

3. The communication device according to claim 1, wherein the second interface is a Peripheral Component Interconnect (PCI) Express interface.

4. The communication device according to claim 1, further comprising a host device,
wherein the semiconductor chip is included in the host device.

5. The communication device according to claim 4, further comprising a slave device,
wherein the memory is included in the slave device.

6. The communication device according to claim 1, further comprising:
a slave device; and
a terminal group included in the slave device,
wherein the first signal lines and the second signal lines are connected to corresponding terminals of the terminal group, respectively.

7. The communication device according to claim 1, further comprising a switch,
wherein the switch switches the common signal line to be used by the first interface or by the second interface.

8. The communication device according to claim 1,
wherein the first interface is used at a first interface mode and the second interface is used at the second interface mode, the second interface mode being different from the first interface mode.

9. A communication method of a communication device executed by a semiconductor chip, wherein the communication device comprises;
a first interface including first signal lines; and
a second interface including second signal lines, one of the first signal lines and one of the second signal lines being shared by the first interface and the second interface as a common signal line,
the communication method comprising:
a first interface initialization step of initializing the first interface using at least one of the first signal lines;
a second interface initialization step of initializing the second interface using at least one of the second signal lines; and
a memory initialization step of initializing a memory via the first interface by using at least one of the first signal lines other than the common signal line, the memory being connected to both the first interface and the second interface,
wherein the second interface initialization step and the memory initialization step are executed in parallel following the first interface initialization step.

10. The communication method according to claim 9, wherein the first interface is a Secure Digital (SD) interface.

11. The communication method according to claim 9, wherein the second interface is a Peripheral Component Interconnect (PCI) Express interface.

12. A communication device comprising:
a first interface including first signal lines;
a second interface including second signal lines, one of the first signal lines and one of the second signal lines being shared by the first interface and the second interface as a common signal line; and
a semiconductor chip,
wherein the semiconductor chip is configured to:
transmit a first initializing signal to the first interface to initialize the first interface through one of the first signal lines,
transmit a second initializing signal to the second interface to initialize the second interface through one of the second signal lines, and
transmit a memory initializing signal to a memory to initialize the memory through one of the first signal lines other than the common signal line, the memory being connected to both the first interface and the second interface, and
the second initializing signal and the memory initializing signal are transmitted in parallel following transmitting the first initializing signal.

* * * * *